(12) United States Patent
Deguchi

(10) Patent No.: US 7,912,110 B2
(45) Date of Patent: Mar. 22, 2011

(54) BASE STATION APPARATUS, WIRELESS COMMUNICATION SYSTEM AND FREQUENCY ASSIGNMENT METHOD

(75) Inventor: Noritaka Deguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1092 days.

(21) Appl. No.: 11/657,566

(22) Filed: Jan. 25, 2007

(65) Prior Publication Data

US 2007/0178840 A1 Aug. 2, 2007

(30) Foreign Application Priority Data

Jan. 30, 2006 (JP) ................. P2006-020812

(51) Int. Cl.
*H04B 1/00* (2006.01)
(52) U.S. Cl. ................ 375/130; 455/62; 455/561
(58) Field of Classification Search ............ 375/130; 455/62, 561
See application file for complete search history.

(56) References Cited

U.S. PATENT DOCUMENTS

| 5,805,633 A | 9/1998 | Uddenfeldt | |
| 2004/0127191 A1* | 7/2004 | Matsunaga | 455/403 |

FOREIGN PATENT DOCUMENTS

| JP | 2003-333648 | 11/2003 |
| JP | 2004-207839 | 7/2004 |

OTHER PUBLICATIONS

Notification of Reasons for Refusal of JP 2006-20812 (Original).*
Notification of Reasons for Refusal of JP 2006-20812 (Translated).*

* cited by examiner

*Primary Examiner* — David C Payne
*Assistant Examiner* — Nader Bolourchi
(74) *Attorney, Agent, or Firm* — Kimble Intellectual Property Law, PLLC

(57) ABSTRACT

A frequency band FC assigned to a first wireless communication system and the frequency bands F1, . . . , Fm assigned to a second wireless communication system are set up for a base station apparatus 100. The base station apparatus 100 periodically performs a frequency detection process A to detect whether or not the frequency bands F1, . . . , Fm are usable for the communication with a mobile station 201. When the base station apparatus 100 and the mobile station 201 are communicating, the base station apparatus determines whether or not the frequency band used for the communication should be changed from FC to F1, . . . , Fm in accordance with its communication status. If it is determined that the frequency band should be changed, the frequency band used for the communication is changed to the frequency band determined as usable through the frequency detection process A.

32 Claims, 17 Drawing Sheets

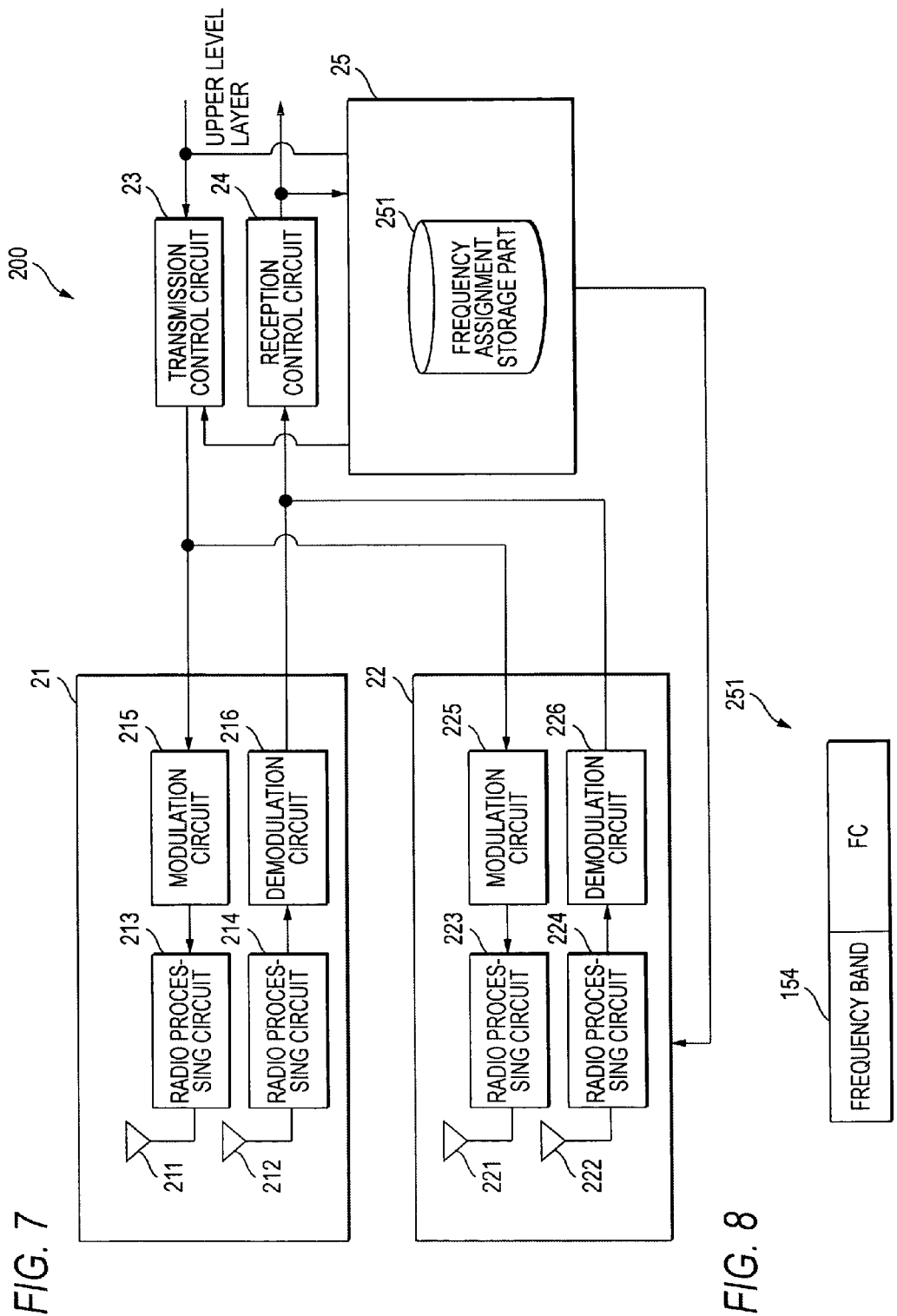

| MOBILE STATION ID | AVERAGE COMMUNICATION FREQUENCY | AVERAGE INFORMATION DATA LENGTH | COMMUNICATION WAIT FREQUENCY F |
|---|---|---|---|
| 1 | 10 | 100 | 0 |
| 2 | 15 | 20 | 5 |
| 3 | 20 | 40 | 0 |
| 4 | 5 | 20 | 5 |
| 5 | 40 | 200 | 0 |

| FREQUENCY BAND | F1 | F2 | F3 | ... | Fm |
|---|---|---|---|---|---|
| FREQUENCY BANDWIDTH | 5 | 15 | 30 | ... | 20 |
| FREQUENCY DETECTION RESULT 5 | 1 | 0 | 0 | ... | 1 |
| FREQUENCY DETECTION RESULT 4 | 0 | 0 | 0 | ... | 1 |
| FREQUENCY DETECTION RESULT 3 | 0 | N/A | 0 | ... | 1 |
| FREQUENCY DETECTION RESULT 2 | 1 | N/A | 0 | ... | 1 |
| FREQUENCY DETECTION RESULT 1 | 0 | N/A | 0 | ... | 0 |
| FREQUENCY USABLE FLAG | 0 | N/A | 1 | ... | 0 |
| FREQUENCY USE STATE FLAG | 0 | 1 | 0 | ... | 0 |

156
157

BASE STATION APPARATUS, WIRELESS COMMUNICATION SYSTEM AND FREQUENCY ASSIGNMENT METHOD

RELATED APPLICATION(S)

The present disclosure relates to the subject matter contained in Japanese Patent Application No. 2006-020812 filed on Jan. 30, 2006, which is incorporated herein by reference in its entirety.

FIELD

The present invention relates to a base station apparatus, a wireless communication system and a frequency assignment method.

BACKGROUND

In the conventional wireless communication system, the usable frequency band is assigned beforehand for each of a plurality of wireless communication systems, and each wireless communication system implements the wireless communication employing an assigned frequency band. However, the users of the wireless communication systems are on the increase at present, and it is difficult to treat the increasing number of users with only the assigned frequency band.

A method for using the frequency efficiently under this situation is provided in which each of a plurality of wireless communication systems has a private frequency band assigned to itself and a frequency band separate from this private frequency band is shared among the plurality of systems, whereby the frequency utilization efficiency, called as spectrum efficiency is improved (e.g., refer to JP-A-2003-333648).

There is disclosed in the document, JP-A-2003-333648, that a wireless communication system A with the increased communication traffic volume of the private frequency band issues a request for using the shared frequency band to another wireless communication system B employing the shared frequency band. Another wireless communication system B receiving the request yields up the shared frequency band to the wireless communication system A, if the communication traffic volume of its own private frequency band is small.

In this manner, the plurality of wireless communication systems employ the shared frequency band in accordance with the communication traffic volume of its own private frequency band, whereby the frequency is efficiently used.

However, in the configuration as described in the document, JP-A-2003-333648, if the communication traffic volume of the private frequency band for the wireless communication system B employing the shared frequency band is large, the wireless communication system B does not yield up the shared frequency band, and the wireless communication system A can not employ the shared frequency band. In this manner, there was a problem that if the communication traffic volume of the plurality of wireless communication systems increase, the wireless communication system that can not employ the shared frequency band has the lower throughput or the refusal of communication request. Further, even if the wireless communication system A employs the shared frequency band, the traffic can not be treated only with the private frequency band and the shared frequency band, when the communication traffic volume greatly increases, resulting in a problem that the lower throughput or the refusal of communication request occurs.

SUMMARY

According to a first aspect of the invention, there is provided a base station apparatus that communicates with a plurality of mobile stations. The base station apparatus includes: a first wireless communication circuit that communicates with a first mobile station employing a first frequency band that is preferentially assigned to the base station apparatus; a plurality of second wireless communication circuits that communicates with a second mobile station employing at least one of a plurality of second frequency bands that are preferentially assigned to other apparatuses; a frequency detection unit that detects the usage of the second frequency bands by periodically detecting the electrical power of the second frequency bands in the second wireless communication circuits; a detection result storage unit that stores a history of the usage of the second frequency bands detected by the frequency detection unit; a communication status storage unit that stores a communication status including an average communication frequency of information data per unit time during the communication with the first and second mobile stations being associated with an ID that is assigned to each of the first and second mobile stations; and a frequency change control unit that determines if there is any unused second frequency band that is not used for the communication with the second mobile station, based on the history of the usage of the second frequency bands stored in the detection result storage unit. The frequency change control unit changes the frequency for the communication with the first mobile station from the first frequency band to the unused second frequency band, based on the determination result of the unused second frequency band and the communication status stored in the communication status storage unit.

According to a second aspect of the invention, there is provided a wireless communication system including: a first mobile station; a plurality of second mobile stations; and a base station apparatus that communicates with the first and second mobile stations. The base station apparatus includes: a first wireless communication circuit that communicates with the first mobile station employing a first frequency band that is preferentially assigned to the base station apparatus; a plurality of second wireless communication circuits that communicates with the second mobile stations employing at least one of a plurality of second frequency bands that are preferentially assigned to other apparatuses; a frequency detection unit that detects the usage of the second frequency bands by periodically detecting the electrical power of the second frequency bands in the second wireless communication circuits; a detection result storage unit that stores a history of the usage of the second frequency bands detected by the frequency detection unit; a communication status storage unit that stores a communication status including an average communication frequency of information data per unit time during the communication with the first and second mobile stations being associated with an ID that is assigned to each of the first and second mobile stations; and a frequency change control unit that determines if there is any unused second frequency band that is not used for the communication with the second mobile station, based on the history of the usage of the second frequency bands stored in the detection result storage unit. The frequency change control unit changes the frequency for the communication with the first mobile station from the first frequency band to the unused second frequency band, based on the determination result of the unused second frequency band and the communication status stored in the communication status storage unit. Each of the first and second mobile stations includes: a third wireless communication circuit that communicates with the base station apparatus employing the first frequency band; and a fourth wireless communication circuit that communicates with the base station apparatus employing at least one of the plurality of second frequency bands.

According to a third aspect of the invention, there is provided a method for assigning a frequency to be used for a wireless communication between a base station and a first mobile station. The base station is configured to communicate with the first base station employing a first frequency band that is preferentially assigned to the base station, and to communicate with a second mobile station employing at least one of a plurality of second frequency bands that are preferentially assigned to other apparatuses. The method includes: detecting the usage of the second frequency bands by periodically detecting the electrical power of the second frequency bands; storing a history of the detected usage of the second frequency bands; calculating a communication status including an average communication frequency of information data per unit time during the communication with the first and second mobile stations; determining if there is any unused second frequency band that is not used for the communication with the second mobile station, based on the stored history of the usage of the second frequency bands; and assigning the frequency for the communication with the first mobile station from the first frequency band to the unused second frequency band, based on the determination result of the unused second frequency band and the calculated communication status.

BRIEF DESCRIPTION OF THE DRAWINGS

In the accompanying drawings:

FIG. 7 is a block diagram showing the configuration of a mobile station 201 according to the first embodiment of the invention;

FIG. 8 is a view showing the configuration of a frequency assignment storage part 26 for the mobile station 201 according to the first embodiment of the invention;

DETAILED DESCRIPTION OF THE EMBODIMENTS

The preferred embodiments of the present invention will be described below with reference to the drawings.

First Embodiment

Figure 1:
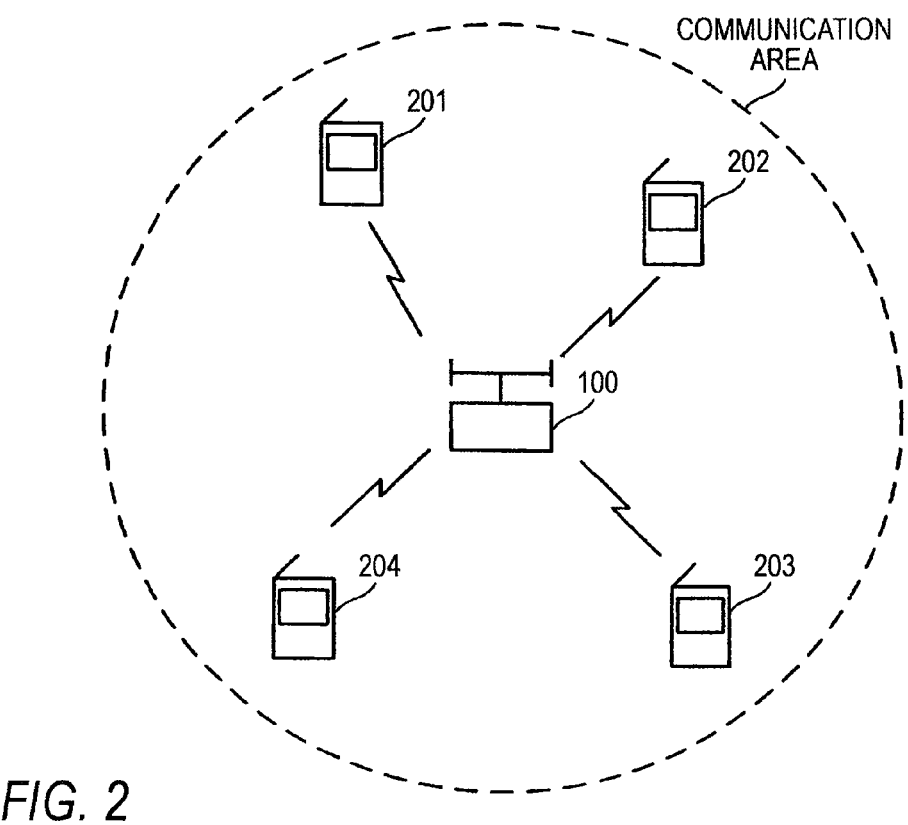
FIG. 1 is a view showing the configuration of a wireless communication system according to a first embodiment of the present invention.

Referring to FIGS. 1 to 14, a first embodiment of the invention will be described below. First of all, the configuration of a wireless communication system according to this embodiment will be described using FIG. 1. In the wireless communication system as shown in FIG. 1, a base station apparatus 100 makes the wireless communication with a plurality of mobile stations 201, 202, . . . (the number of mobile stations is four in the example shown in FIG. 1) in a range of communication area by time division multiple access or frequency division multiple access, for example.

Herein, for the wireless communication between the base station apparatus 100 and the mobile stations 201, 202, a frequency band assigned beforehand to this wireless communication system (hereinafter referred to as a first wireless communication system) is employed. Also, for the wireless communication between the base station apparatus 100 and the mobile stations 203, 204, frequency bands which are satisfied certain conditions as will be described later from a plurality of frequency bands assigned to another wireless communication system (hereinafter referred to as a second wireless communication system) are employed. That is, the base station apparatus 100 makes the wireless communication with a plurality of mobile stations 201, 202, . . . , employing a plurality of frequency bands.

Figure 2:
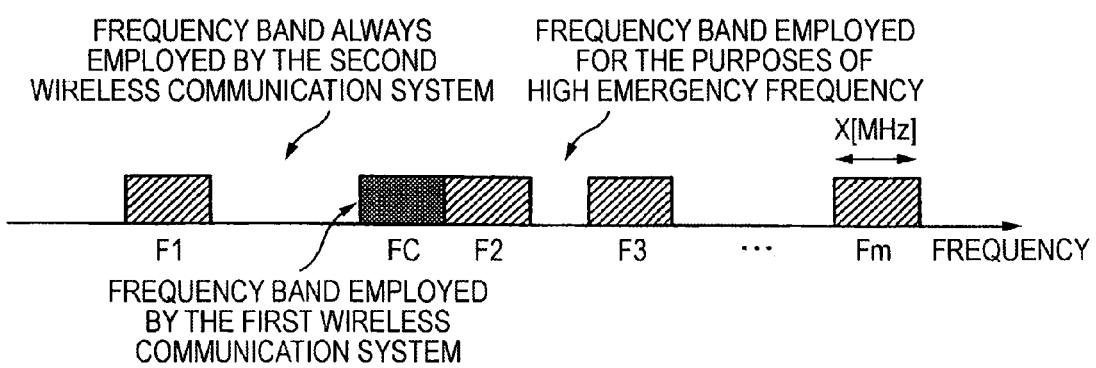
FIG. 2 is a view showing the configuration of frequency bands according to the first embodiment of the invention.

Referring to FIG. 2, the frequency bands used for the wireless communication will be described below in detail. The frequency band FC of FIG. 2 is assigned beforehand to the first wireless communication system. Also, the frequency bands F1, F2, . . . and Fm are the frequency bands assigned to the second wireless communication system, satisfying the conditions where they are not employed by the second wireless communication system at any time, not employed in a range of communication area of the first wireless communication system and its neighborhood, and not employed for the purposes of high emergency. The frequency bands F1, F2, . . . and Fm are decided beforehand by the first wireless communication system.

The base station apparatus 100 prestores the frequency bands FC, F1, F2, . . . and Fm as usable for the wireless communication, and employs them for the wireless communication with the mobile stations 201, 202, . . . depending on the situation. In this embodiment, all the frequency bands FC, F1, F2, . . . and Fm have the same frequency bandwidth X[MHz].

Figure 3:
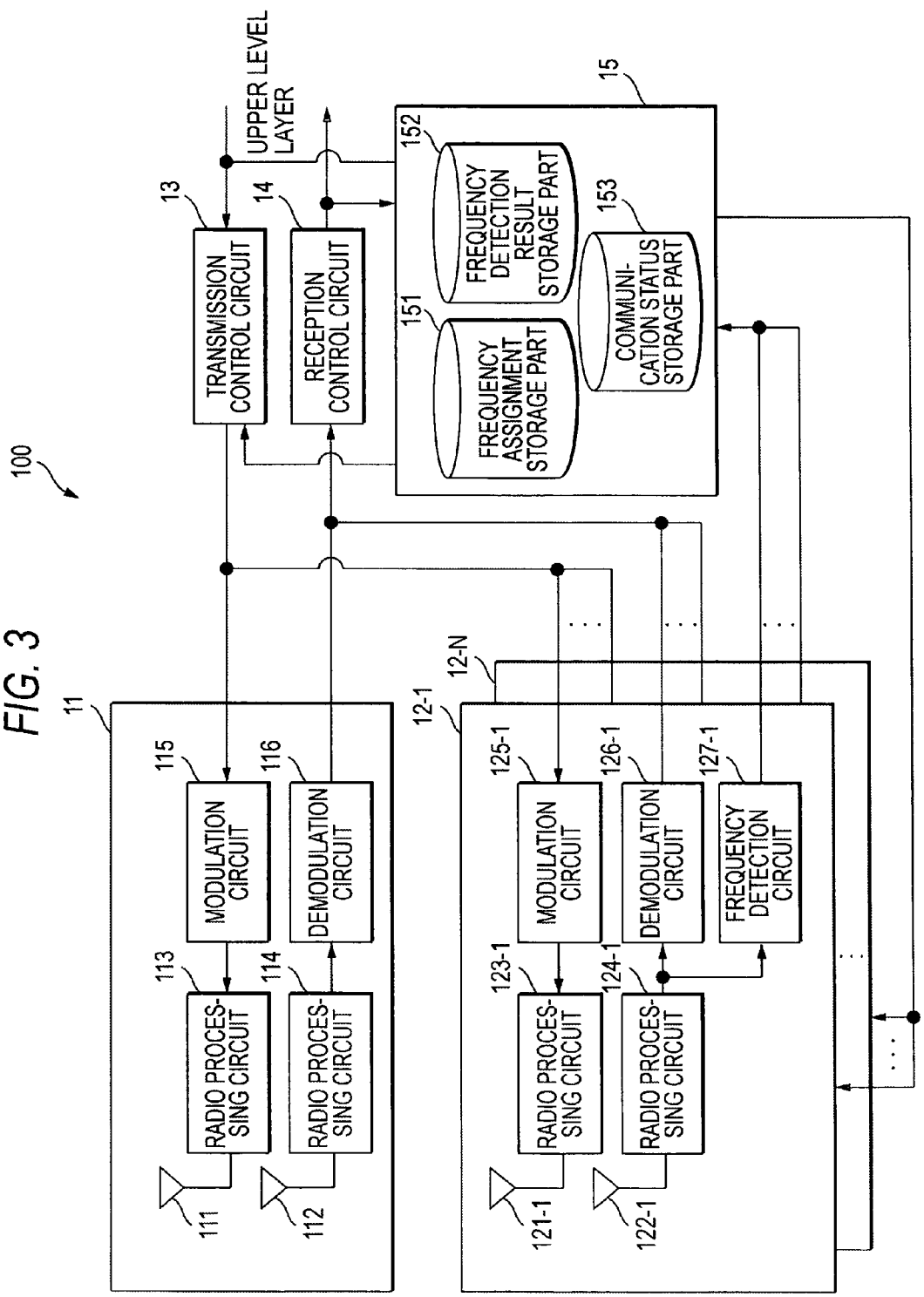
FIG. 3 is a block diagram showing the configuration of a base station apparatus 100 according to the first embodiment of the invention.

Referring to FIGS. 3 and 8, the configuration examples of the base station apparatus 100 and the mobile stations 201, 202, . . . making up the wireless communication system according to this embodiment will be described below.

FIG. 3 shows a configuration example of the base station apparatus 100. The base station apparatus 100 as shown in FIG. 3 comprise a first wireless communication circuit 11 corresponding to the frequency band FC, the second wireless communication circuits 12-1, . . . , 12-N (N>m) corresponding to the frequency bands F1, F2, . . . and Fm, a transmission control circuit 13, a reception control circuit 14 and a control part 15.

Subsequently, the detailed configuration of each part will be described below. The first wireless communication circuit 11 has a transmitting antenna 111, a receiving antenna 112, a transmitting radio processing circuit 113 connected to the transmitting antenna 111, a receiving radio processing circuit 114 connected to the receiving antenna 112, a modulation circuit 115 connected between the transmission control circuit 13 and the transmitting radio processing circuit 113, and a demodulation circuit 116 connected between the receiving radio processing circuit 114 and the reception control circuit 14, and transmits or receives the data, employing the frequency band FC. Also, the second wireless communication circuit 12-1 has a frequency detection circuit 127-1 connected to the control part 15, in addition to the components of the first wireless communication circuit 11, and transmits or receives the data in accordance with an instruction from the control part 15, employing one of the frequency bands F1, F2, . . . and Fm. The second wireless communication circuits 12-2, . . . , 12-N have the same configuration as the second wireless communication circuit 12-1, and are not described here.

The control part 15 has a frequency assignment storage part 151, a frequency detection result storage part 152, and a communication status storage part 153. And the control part switches the first wireless communication circuit 11 and the second wireless communication circuits 12-1, . . . , 12-N between transmission and reception, and generates the control data, as well as deciding the frequency band used for the communication between the base station apparatus 100 and the mobile stations 201, 202, . . . in accordance with the usage of the frequency bands FC, F1, F2, . . . and Fm.

Figure 4:
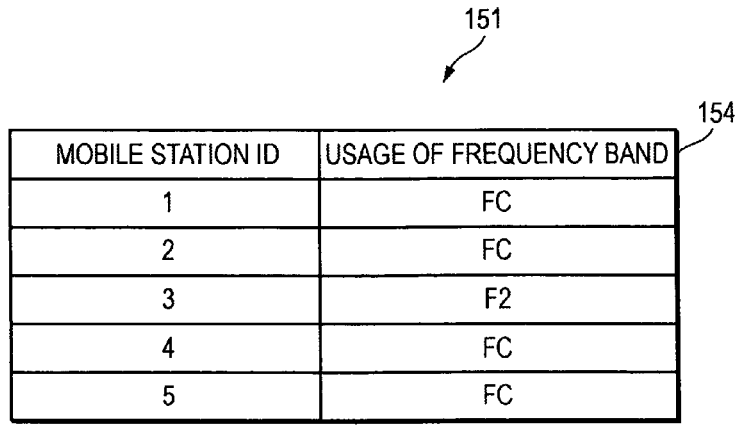
FIG. 4 is a view showing the configuration of a frequency assignment storage part 151 for the base station apparatus 100 according to the first embodiment of the invention.
Figure 5:
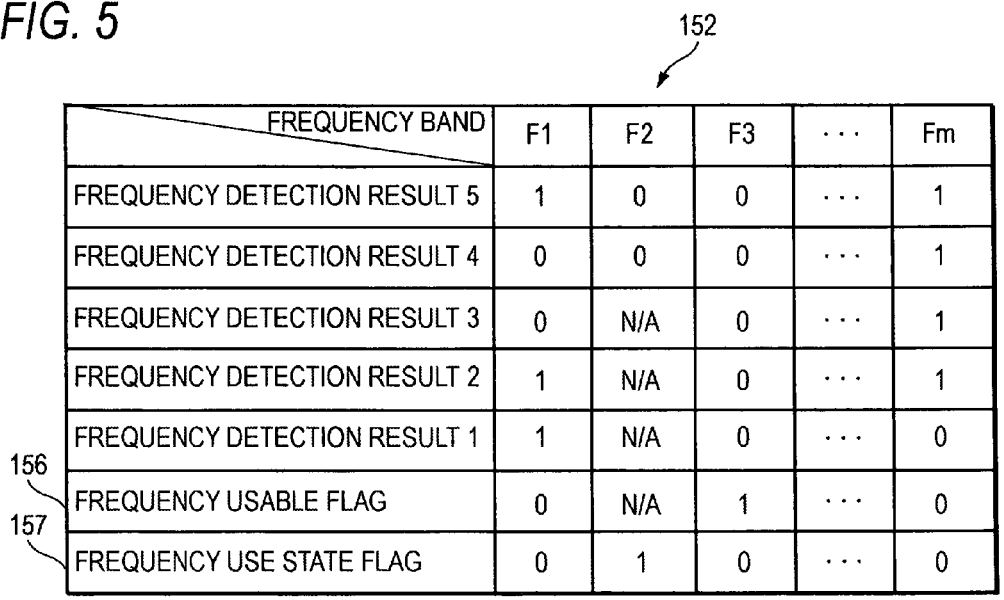
FIG. 5 is a view showing the configuration of a frequency detection storage part 152 according to the first embodiment of the invention.
Figure 6:
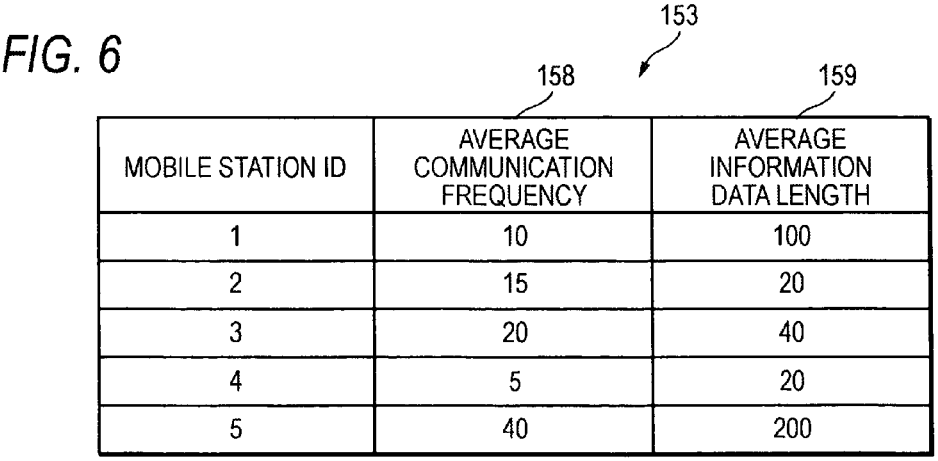
FIG. 6 is a view showing the configuration of a communication status storage part 153 according to the first embodiment of the invention.

Referring to FIGS. 4 to 6, the frequency assignment storage part 151, the frequency detection result storage part 152 and the communication status storage part 153 will be described below. Firstly, FIG. 4 is a view showing one example of a table of the frequency assignment storage part 151. This table stores the ID specifying each mobile station 201, 202, . . . with which the base station apparatus 100 communicates, and the frequency band 154 used for the communication with the mobile station 201, 202, . . . corresponding to each mobile station ID. In the example as shown in FIG. 4, there are five mobile stations communicating with the base station apparatus 100. The mobile station with mobile station ID "3" makes the communication, employing the frequency band F2, and the remaining four mobile stations (ID "1", "2", "4", "5") make the communication, employing the frequency band FC.

FIG. 5 is a view showing one example of a table of the frequency detection storage part 152. This table stores the frequency detection results 1 to n made n (n is any integer, n=5 in FIG. 5) times in the past for each of the frequency bands F1, F2, . . . and Fm, and a frequency usable flag 156 and a frequency usage state flag 157 that are calculated based on the frequency detection results 1 to n.

In the table as shown in FIG. 5, the results of frequency detection made five times in the past for each of the frequency bands F1, F2, . . . and Fm are stored in the frequency detection results 1 to 5. The newest detection results are stored in the frequency detection result 1, and the oldest detection results are stored in the frequency detection result 5. The frequency band (e.g., F1) with the frequency detection result 1 of "1" indicates that the second wireless communication system employs its frequency band for communication, and the frequency band (e.g., F3, Fm) with the frequency detection result 1 of "0" indicates that the second wireless communication system does not employ its frequency band for communication. Also, the frequency band (e.g., F2) with the frequency detection result 1 of "N/A" indicates that its frequency band is already employed for the communication with the mobile stations 201, 202, . . . .

The frequency usable flag 156 stores the result of calculating whether or not the base station apparatus 100 can communicate with the mobile stations 201, 202, . . . , employing the frequency bands F1, F2, . . . and Fm, based on the frequency detection results 1 to 5. It is indicated that the frequency band (e.g., F3) with the frequency usable flag 156 of "1" is usable for the communication with the mobile stations 201, 202, . . . , and the frequency band (e.g., F1) with the frequency usable flag 156 of "0" is unusable for the communication with the mobile stations 201, 202, . . . . For this frequency usable flag 156, like the frequency detection results 1 to 5, "N/A" is written in the frequency band (e.g., F2) already used for the communication between the base station apparatus 100 and the mobile stations 201, 202, . . . .

The frequency usage state flag 157 stores whether or not each of the frequency bands F1, F2, . . . and Fm is employed for the communication between the base station apparatus 100 and the mobile stations 201, 202, . . . . It is meant that the frequency band (e.g., F2) with the frequency usage state flag 157 of "1" is employed by the base station apparatus 100 for the communication with the mobile stations 201, 202, . . . , and the frequency band (e.g., F1, F3, Fm) with the frequency usage state flag 157 of "0" is not employed for the communication with the mobile stations 201, 202, . . . .

FIG. 6 is a view showing one example of a table of the communication status storage part 153. This table stores an average communication frequency 158 and an average information data length 159 for the ID intrinsic to each mobile station, as the communication status between the base station apparatus 100 and the mobile stations 201, 202, . . . . Herein, the average communication frequency 158 is the number of transmitting the information data to the mobile stations 201, 202, . . . per unit time. The average information data length 159 is the average data length of information data such as application data for a predetermined number of transmissions.

Referring to FIGS. 7 and 8, the configuration of the mobile stations 201, 202, . . . will be described below. Since a plurality of mobile stations 201, 202, . . . for making the communication with the base station apparatus 100 have the same configuration, the configuration of the mobile stations 201, 202 will be described below as a representative example 200.

The mobile station 200 as shown in FIG. 7 has a first wireless communication circuit 21, a second wireless communication circuit 22, a transmission control circuit 23, a reception control circuit 24 and a control part 25. The first wireless communication circuit 21 has the same configuration as the first wireless communication circuit 11 of the base station apparatus 100 as shown in FIG. 3. Also, the second wireless communication circuit 22 has the almost same configuration as the second wireless communication circuit 12 of the base station apparatus 100 as shown in FIG. 3, but does not have the frequency detection circuit 127 which the second wireless communication circuit 12 of the base station apparatus 100 has. Also, the control part 25 has a frequency assignment storage part 251.

FIG. 8 shows one example of a table of the frequency assignment storage part 251, which stores the frequency band used for communication with the base station apparatus 100. In the example of FIG. 8, the mobile station 200 makes the communication employing the frequency band FC, whereby the frequency assignment storage part 251 of FIG. 8 stores "FC" as the used frequency band 154.

Referring to FIGS. 3 to 14, the operation of the base station apparatus 100 and the mobile stations 201, 202, . . . will be described below.

First of all, the operation where the base station apparatus 100 transmits or receives the data will be described using FIG. 3. When the information data such as application data is transmitted, this information data is inputted into the transmission control circuit 13 from an upper level layer. Also, in transmitting the control data generated by the control part 15, this control data is likewise inputted from the control part 15 into the transmission control circuit 13. Thereafter, the information data and the control data are generally referred to as transmission data.

The transmission control circuit 13 outputs the input transmission data to the first wireless communication circuit 11 or any one of the second wireless communication circuits 12-1, . . . , 12-N. The wireless communication circuit 12-k (k is any integer from 1 to N) is decided in accordance with a notification from the control part 15. Since the operation of the wireless communication circuit into which the transmission data is inputted is the same for the first wireless communication circuit 11 or any second wireless communication circuit 12-k, an instance where the transmission data is inputted into the first wireless communication circuit 11 will be described below.

The transmission data inputted into the first wireless communication circuit 11 is firstly error correcting encoded, and modulated in accordance with a predetermined modulation method in the modulation circuit 115, and outputted to the transmitting radio processing circuit 113. The transmitting radio processing circuit 113 performs the radio processing such as D/A conversion, quadrature modulation, up conversion, band limit and power amplification for the input transmission data after modulation to generate a radio signal. The generated radio signal is transmitted via the transmitting antenna 111 to the mobile station. The frequency band of the radio signal processed and transmitted in the second radio transmission circuit 12-k is decided in accordance with a notification from the control part 15.

An instance where the base station apparatus 100 receives the data will be described below. The radio signal received by the receiving antenna 112 or the receiving antennas 122-1, . . . , 122-N is inputted into the respective receiving radio processing circuits 114, 124-1, . . . , 124-N. Since the radio signal inputted into the receiving radio processing circuit 114, 124-1, . . . , 124-N is processed in the same manner, a process for the radio signal inputted into the receiving radio processing circuit 114 will be described below.

The receiving radio processing circuit 114 performs the radio processing such as power amplification, band limit, down conversion, quadrature demodulation and A/D conversion for the input radio signal to generate the reception data and outputs it to the demodulation circuit 116. The demodulation circuit 116 demodulates the input reception data, performs the error correcting decoding process, and outputs the data to the reception control circuit 14. The reception control circuit 14 outputs the data to the upper level layer for the information data, or to the control part 15 for the control data, based on a judgment of the header part of the reception data.

In communicating with the mobile stations 201, 202, . . . or performing a frequency detection process A, the control part 15 selects the second wireless communication circuit 12-k, and notifies the frequency band of the received radio signal to the second wireless communication circuit 12-k. Accordingly, the receiving radio processing circuit 124-k of the selected second wireless communication circuit 12-k performs the radio process in accordance with the notified frequency band. Also, the receiving radio processing circuit 124-k outputs the reception data to the demodulation circuit 126-k or the frequency detection circuit 127k in accordance with a notification from the control part 15. The demodulation circuit 126-k demodulates the input reception data, performs the error correcting decoding process, and outputs the data to the reception control circuit 14. On the other hand, the frequency detection circuit 127-k measures the electrical power as a part of the frequency detection process A for the input reception data, and outputs the result to the control part 15.

Since the mobile stations 201, 202, . . . make the transmission or reception of data in the same manner as the base station apparatus 100 as shown in FIG. 3, the explanation is omitted. The mobile stations 201, 202, . . . , which have only one second wireless communication circuit 22, employs this second wireless communication circuit 22 in transmitting or receiving the data, employing the frequency bands F1, F2, . . . and Fm. The frequency band of the radio signal transmitted or received from the second wireless communication circuit 22 is decided in accordance with a notification from the control part 25.

Figure 9:
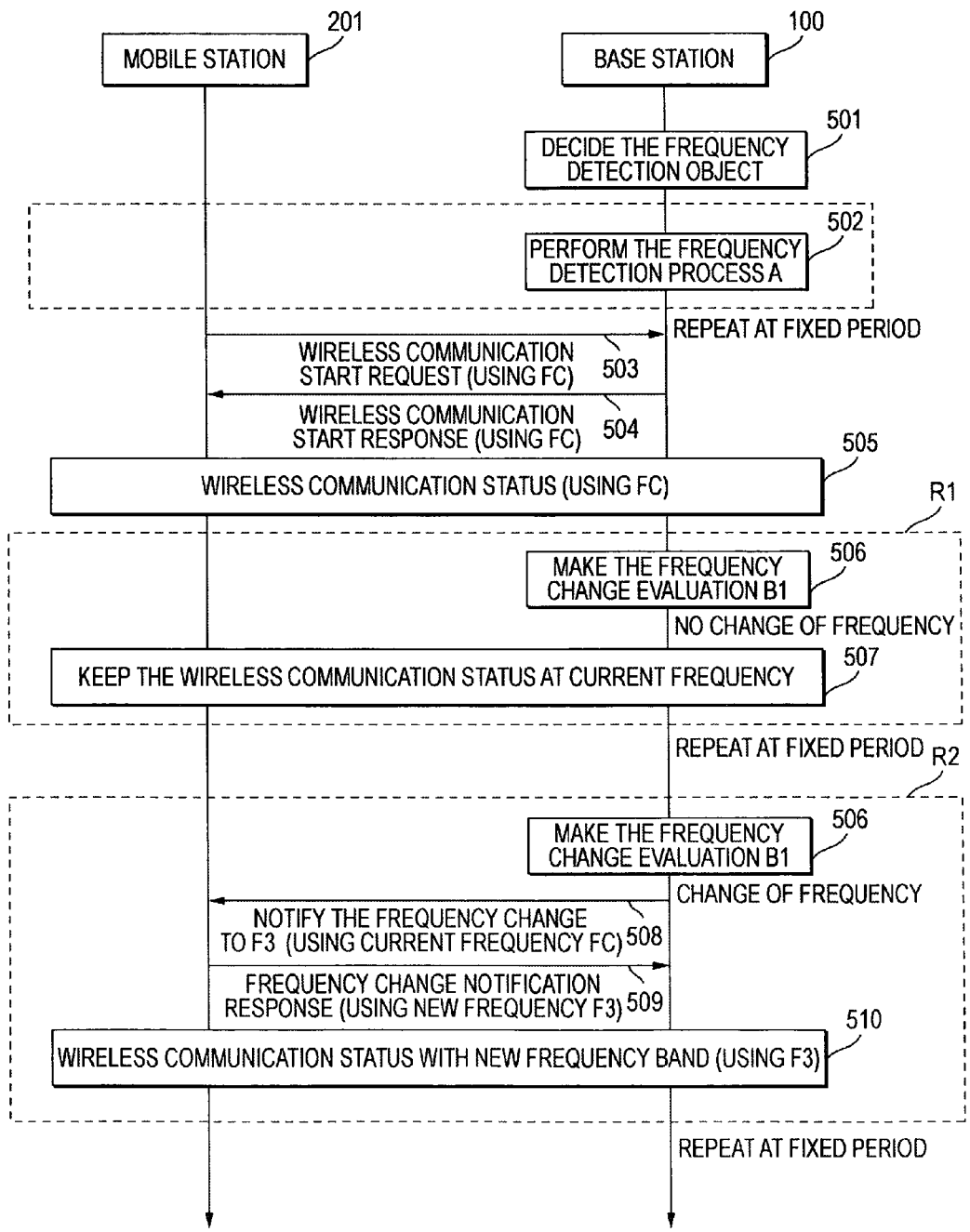
FIG. 9 is a sequence diagram showing the wireless communication between the base station apparatus 100 and the mobile station 201 according to the first embodiment of the invention.

Referring now to FIG. 9, the wireless communication between the base station apparatus 100 and the mobile stations 201, 202, . . . will be described below. FIG. 9 is a sequence diagram showing the wireless communication between the base station apparatus 100 and the mobile stations 201. In FIG. 9, the mobile station 201 makes a request for wireless communication to the base station apparatus 100 and starts the wireless communication, but the base station apparatus 100 may makes a request for wireless communication to the mobile station 201.

First of all, the base station apparatus 100 sets up beforehand the frequency band used for the communication with the mobile station 201 before starting the communication with the mobile station 201 (501). The set frequency band is the frequency band FC assigned to the first wireless communication system, and frequency bands F1, . . . , Fm assigned to the second wireless communication system. The set-up means specifying the frequency band except for the frequency band used by the second wireless communication system at any time and the frequency band used for the purposes of high emergency and deciding its center frequency.

To employ these frequency bands for the communication with the mobile station 201, it is necessary that they are not employed by the second wireless communication system. Thus, the control part 15 periodically performs a frequency detection process A for the set frequency band, regardless of whether or not it is used for communication with the mobile station 201, and determines the usage of employing each of the frequency bands F1, . . . , Fm to update the frequency detection result storage part 152 (502).

In starting the wireless communication between the mobile station 201 and the base station apparatus 100, the mobile station 201 makes a request for wireless communication to the base station apparatus 100 employing the frequency band FC (503). The base station apparatus 100 received the request notifies a response to the mobile station 201, employing the frequency band FC in the same manner (504). Thereby, the mobile station 201 and the base station apparatus 100 are logically connected to start the wireless communication. At this time, the frequency band used for the communication is FC, and the frequency band FC is stored in the frequency assignment storage part 151 of the base station apparatus 100 and the frequency assignment storage part 251 of the mobile station 201, whereby this frequency band FC is employed for the following communication (505).

The base station apparatus 100 periodically performs a frequency change evaluation B1 to evaluate the frequency band optimal for the communication with this mobile station 201, while communicating with the mobile station 201 (506 of R1). The details of the frequency change evaluation B1 will be described later. As a result of the frequency change evaluation B1, if the frequency band (frequency band FC in FIG. 9) used for the current communication should be maintained, the base station apparatus 100 makes the communication with the mobile station 201, still employing the frequency band FC (507 of R1).

On the other hand, if it is evaluated that the frequency band FC used for the communication at present should be changed to the optimal frequency band (e.g., F3) by performing the frequency change evaluation B1 (506 of R2), the control part 15 of the base station apparatus 100 decides to make the communication with the mobile station 201 employing the frequency band F3 and notifies a change to the frequency band F3 to the mobile station 201 employing the frequency band FC before change (508 of R2). Also, the control part 15 updates the used frequency band 154 stored in the frequency assignment storage part 151 to F3, and updates F3 of the frequency detection result 1 in the frequency detection result storage part 152 to "N/A". On the other hand, the control part 25 of the mobile station 201 receiving this notification changes the used frequency band 154 in the frequency assignment storage part 251 to "F3" in accordance with the notification, and notifies a frequency change notification response to the base station apparatus 100 employing the frequency band F3 (509 of R2). After that, the base station apparatus 100 and the mobile station 201 make the communication employing the frequency band F3 (510 of R2).

Figure 10:
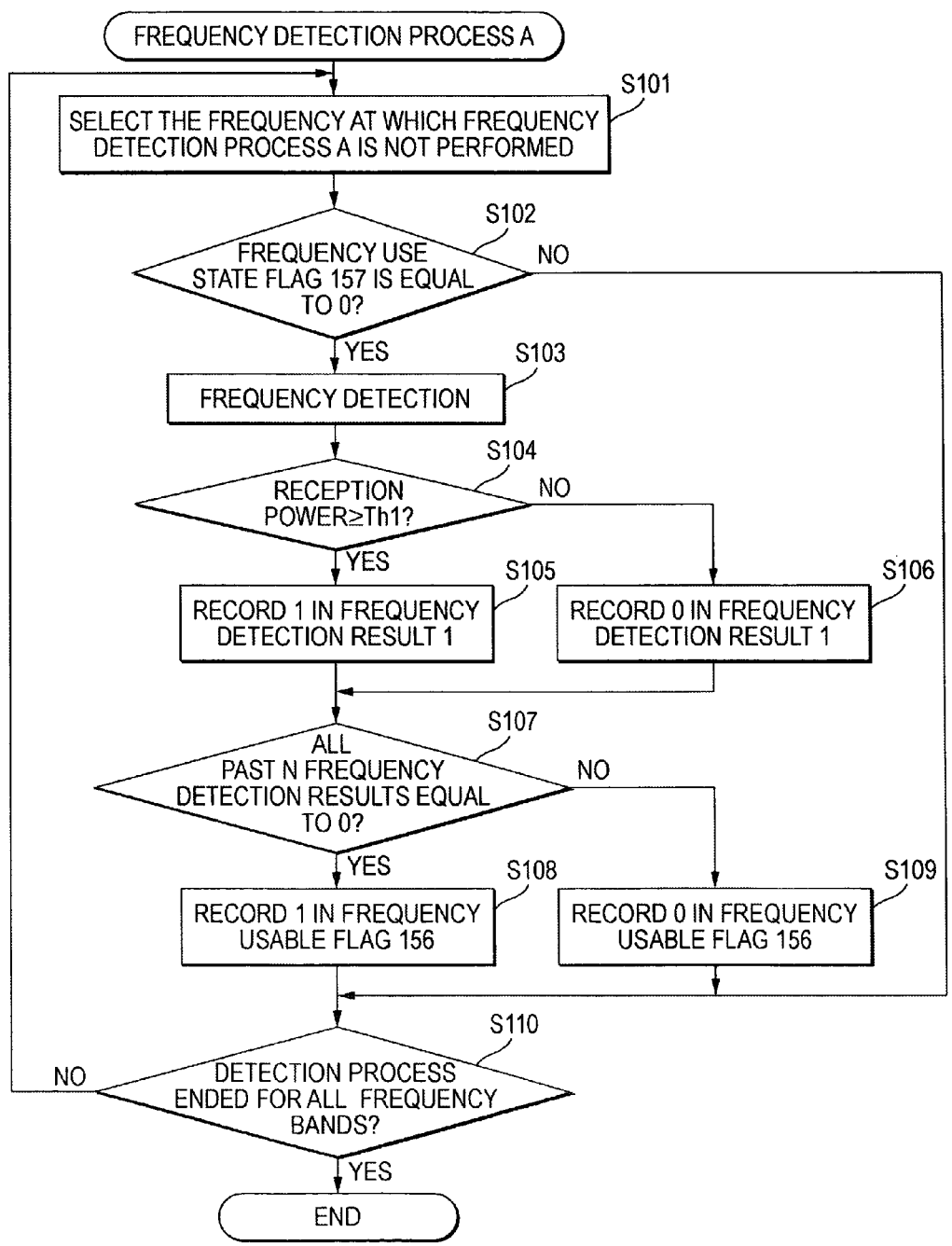
FIG. 10 is a flowchart showing the flow of a frequency detection process A according to the first embodiment of the invention.

Referring now to a flowchart of FIG. 10, a frequency detection process A performed by the control part 15 of the base station apparatus 100 will be described below.

The control part 15 selects one frequency band in which the frequency detection process A is not performed from among the stored frequency bands F1, . . . , Fm by referring to the frequency detection result storage part 152 every time a fixed period passes (step S101). Herein, it is assumed that the frequency band F1 is selected. Then, the control part 15 determines whether or not the frequency usage state flag 157 for the selected frequency band F1 is "0" (i.e., whether or not the frequency band F1 is usable) by referring to the frequency usage state flag 157 for the frequency band F1 (step S102).

As a result of determination, if the frequency usage state flag 157 is "1" (unusable), and the process for all the frequency bands is not ended (step S102, No at S110), the procedure returns to step S101 for determination of the next frequency band. On the other hand, as a result of determination, if the frequency usage state flag 157 is "0" (usable) (Yes at step S102), the control part 15 selects the wireless communication circuit not employed for the communication with the mobile stations 201, 202, . . . during the execution of this frequency detection process A from among the second wireless communication circuits 12-1, . . . , 12-N, and issues a frequency detection instruction to the selected second wireless communication circuit. Herein, it is assumed that the second wireless communication circuit 12-1 is selected.

The receiving radio processing circuit 124-1 of the selected second wireless communication circuit 12-1 receives a radio signal of the frequency band F1 via the antenna 122-1 to confirm that the frequency band is unused. Further, the receiving radio processing circuit 124-1 measures the electrical power of the received signal in the frequency detection circuit 127-1, and outputs the result to the control part 15 (step S103). Then, the control part 15 compares the result inputted from the frequency detection circuit 127-1 with a preset threshold Th1 (step S104). As a result of comparison, if the result is greater than or equal to the threshold Th1 (Yes at step S104), the control part 15 determines that the second wireless communication system employs the frequency band F1, and stores the detection result "1" in the frequency detection result 1 (see FIG. 5) of the frequency detection result storage part 152 (step S105). On the other hand, if the result is smaller than the threshold Th1 (No at step S104), the control part 15 determines that the second wireless communication system does not employ the frequency band F1, and stores the detection result "0" in the frequency detection result 1 (step S106). In addition, the control part 15 updates the frequency detection results 2 to N.

The control part 15 determines whether or not all the frequency detection results 1 to N are "0" by referring to the frequency detection results 1 to N after update (step S107). If all the frequency detection results 1 to N are "0", the control part determines that the frequency band F1 is usable for the communication with the mobile stations 201, 202, . . . , and stores "1" in the frequency usable flag 156 of the frequency band F1 (step S108). On the other hand, if any of the frequency detection results 1 to N stores "1", the control part determines that the frequency band F1 can not be employed for the communication with the mobile stations 201, 202, . . . , and stores "0" in the frequency usable flag 156 (step S109).

The above is the frequency detection process for one frequency band. The control part determines whether or not this process is performed for all the frequency bands F1, . . . , Fm (step S110). If the frequency detection process is performed for all the frequency bands F1, . . . Fm, the frequency detection process is ended. Also, if there is any frequency band for which the frequency detection process is not performed, the procedure returns to step S101, whereby the steps S101 to S110 are repeated.

Figure 11:
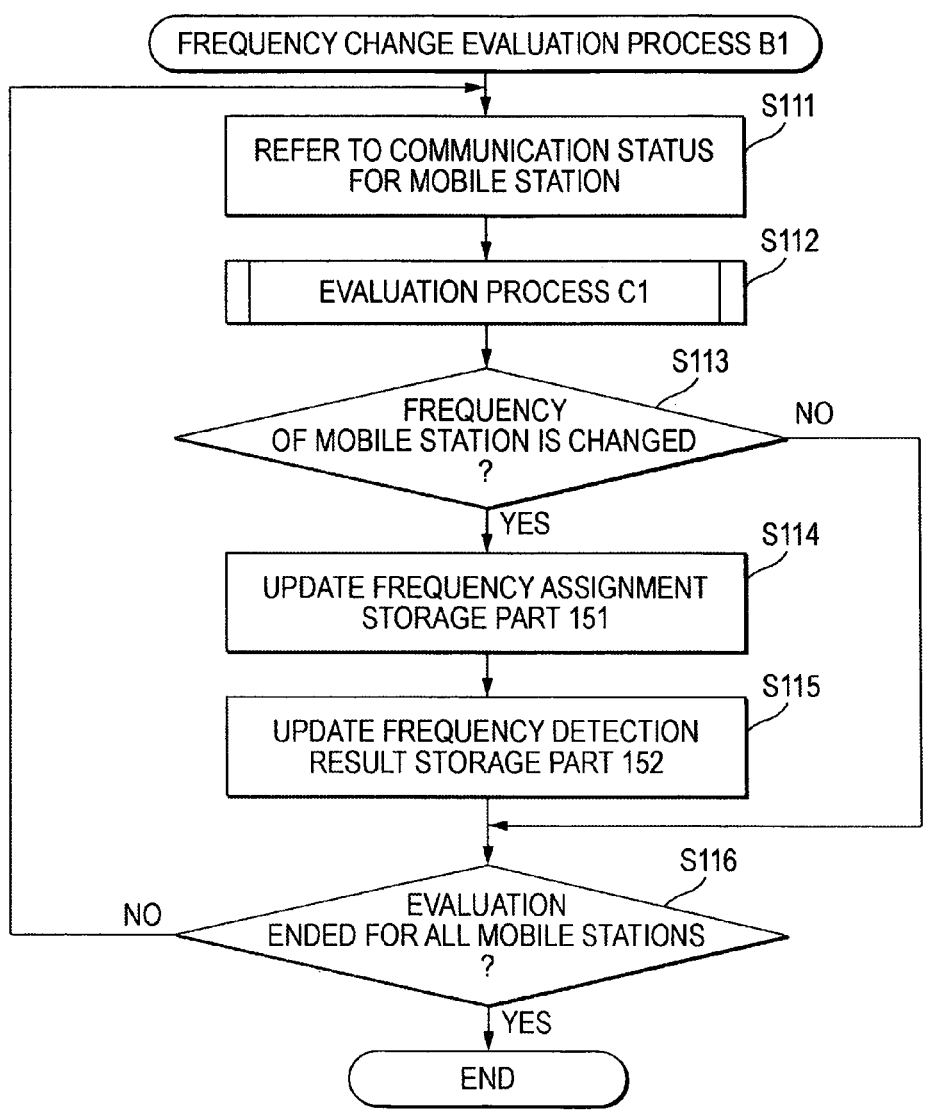
FIG. 11 is a flowchart showing the flow of a frequency change evaluation process B1 according to the first embodiment of the invention.

Referring now to the flowcharts of FIGS. 11 to 14, a frequency change evaluation process B1 performed by the control part 15 of the base station apparatus 100 will be described below. FIG. 11 shows a flowchart of the frequency change evaluation process B1. The frequency change evaluation process B1 is performed at every fixed period while the base station apparatus 100 is communicating with any one of the mobile stations 201, 202, . . . .

First of all, the control part 15 selects one of the mobile stations 201, 202, . . . making the wireless communication if the fixed period passes, refers to the communication status storage part 153 (step S111), and performs an evaluation process C1 for the selected mobile station (step S112). In the following, it is assumed that the mobile station 201 is selected.

As a result of the evaluation process C1 at step S112, if it is determined that the frequency band used for the communication with the mobile station 201 is changed (Yes at step S113), the control part 15 updates the used frequency band 154 of the mobile station 201 stored in the frequency assignment storage part 151 (step S114). Also, the control part 15 updates the frequency usage state flag 157 of the frequency band Fi (i is 1, 2, 3, . . . or m) stored in the frequency detection result storage part 152 to "1" (step S115).

The above is the frequency change evaluation process for the mobile station 201. It is determined whether or not this process is performed for all the mobile stations 201, 202, . . . making the communication with the base station apparatus 100 (step S116). And if this process is performed for all the mobile stations 201, 202, . . . , the frequency change evaluation process B1 is ended. On the other hand, if there is any mobile station for which the frequency change evaluation process is not performed, the procedure returns to step S111, whereby the steps S111 to S116 are repeated.

Figure 12:
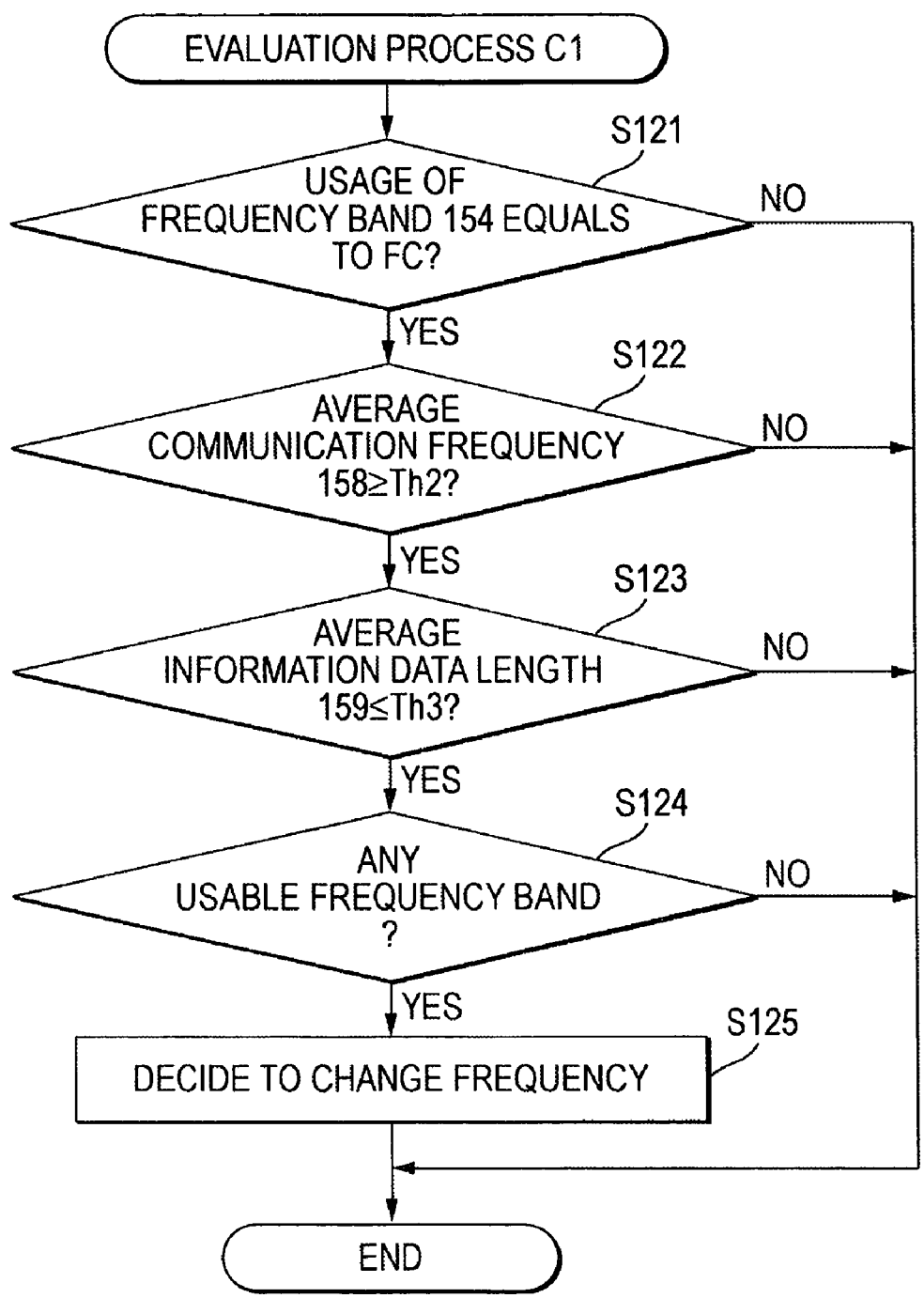
FIG. 12 is a flowchart showing the flow of an evaluation process C1 according to the first embodiment of the invention.
Figure 13:
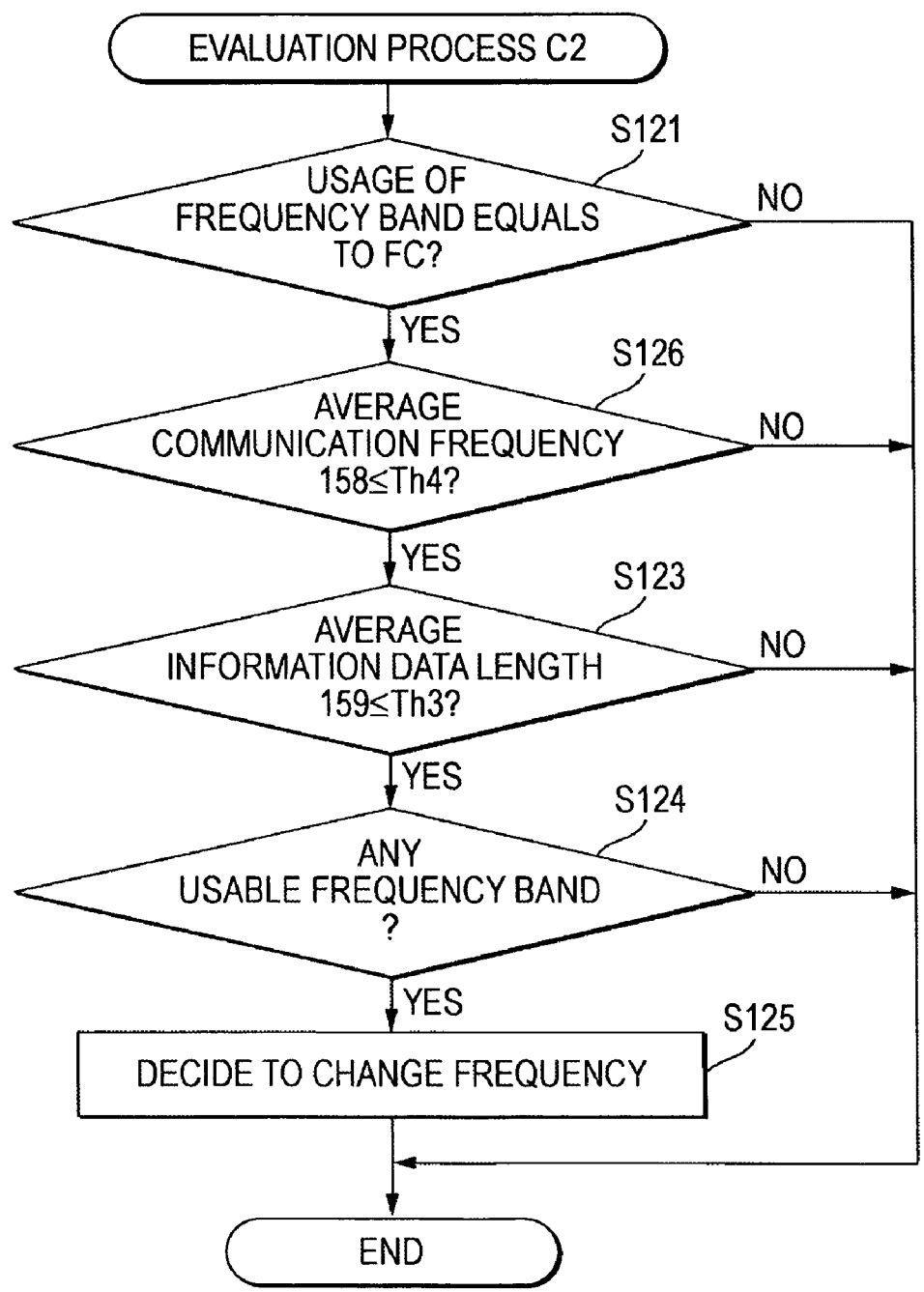
FIG. 13 is a flowchart showing the flow of an evaluation process C2 according to the first embodiment of the invention.
Figure 14:
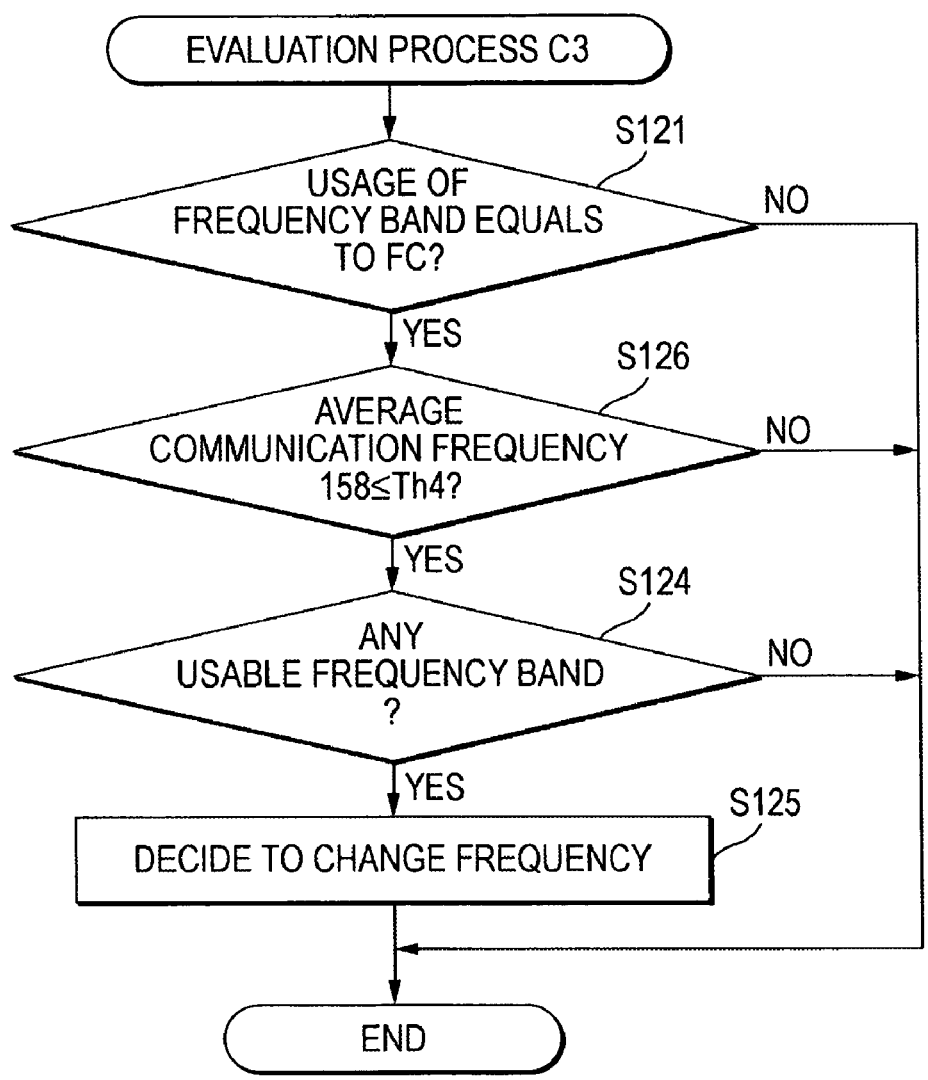
FIG. 14 is a flowchart showing the flow of an evaluation process C3 according to the first embodiment of the invention.

Referring now to FIGS. 12 to 14, an evaluation process C1 will be described below. Herein, the evaluation process for the mobile station 201 is performed following the frequency change evaluation process.

In the evaluation process C1 as shown in FIG. 12, first of all, the control part 15 determines whether or not the frequency band used for the mobile station 201 is the frequency band FC assigned to the first wireless communication system by referring to the frequency assignment storage part 151 (step S121). If the used frequency band 154 is not "FC", it is decided that the change of the frequency band is not performed and the process is ended.

On the other hand, if the used frequency band 154 is "FC", it is determined whether or not the value of the average communication frequency 158 (see FIG. 6) stored-with the ID of the mobile station 201 is greater than or equal to a preset threshold Th2 by referring to the communication status storage part 153 (step S122). If the value of the average communication frequency 158 is smaller than the threshold Th2, it is decided that the change of the frequency band is not performed and the process is ended.

On the other hand, if the average communication frequency 158 is greater than or equal to the threshold Th2, it is determined whether or not the value of the average information data length 159 (see FIG. 6) stored with the ID of the mobile station 201 is smaller than or equal to a preset threshold Th3 by referring to the communication status storage part 153 again (step S123). As a result of determination, if the value of the average information data length 159 is greater than the threshold Th3, it is decided that the change of the frequency band is not performed and the process is ended.

On the other hand, if the average information data length 159 is smaller than or equal to the threshold Th3, it is determined whether or not there is any changeable frequency band by referring to the frequency usable flag 156 of the frequency detection result storage part 152. That is, it is determined that if all the frequency usable flags 156 are "0" by referring to the frequency usable flags 156 of all the frequency bands F1, . . . Fm, there is no changeable frequency band, or if there is any frequency band in which the frequency usable flag 156 is "1", there is any changeable frequency band (step S124).

As a result of determination, if there is no changeable frequency band, it is decided that the change of the frequency band is not performed and the process is ended. On the other hand, if there is any changeable frequency band Fi, the control part 15 decides the change of the frequency band Fi (step S125).

At this time, if the frequency band Fi in which the frequency usable flag 156 is "1" is F3 alone, as shown in FIG. 5, the control part 15 decides that the frequency band F3 is employed. Also, if a plurality of frequency usable flags 156 are "1", the frequency band Fi closest to the frequency band FC assigned to the first wireless communication system, for example, is selected, and the control part 15 decides that the frequency band Fi is employed for the communication with the mobile station 201.

That is, in the evaluation process C1, the communication status of the mobile stations 201, 202, . . . are evaluated. If there is any mobile station communicating a small amount of information data at high frequency, the frequency band is changed to make the communication employing any of the frequency bands F1, . . . , Fm.

Referring now to FIG. 13, a variant example of the evaluation process C1 will be described below. While it is determined at step S122 whether or not the value of the average communication frequency 158 is greater than or equal to the threshold Th2 in the evaluation process C1 as shown in FIG. 12, it is determined whether or not the value of the average communication frequency 158 is smaller than or equal to a threshold Th4 in the evaluation process C2 as shown in FIG. 13 (step S126). That is, in the evaluation process C2, the communication status of the mobile stations 201, 202, . . . are evaluated, and if there is any mobile station communicating a small amount of information data at low frequency, the frequency band is changed to make the communication employing any of the frequency bands F1, . . . , Fm.

Referring now to FIG. 14, another variant example of the evaluation process C2 will be described below. The evaluation process C3 as shown in FIG. 14 performs the almost same operation as the evaluation process C2 as shown in FIG. 13, but is different in that the comparison between the value of the average information data length 159 and the threshold Th3 is not performed, although it is performed at step S123 in the evaluation process C2. That is, in this evaluation process C3, the communication status of the mobile stations 201, 202, . . . are evaluated, and if there is any mobile station in which the value of the average communication frequency 158 is low, the frequency band is changed to make the communication employing any of the frequency bands F1, . . . , Fm.

With the first embodiment as described above, the plurality of frequency bands F1, . . . , Fm assigned to the second wireless communication system are employed for the communication between the base station apparatus 100 and the mobile stations 201, 202, . . . , if the second wireless communication system does not employ the frequency band for a certain term, whereby the limited frequency resources can be used efficiently without causing the lower throughput or the refusal of communication request even if the number of users or the communication traffic volume increases in the first wireless communication system. Further, the mobile stations 201, 202, . . . making the communication through the selected frequency band are limited to the mobile stations satisfying the prescribed conditions, such as communicating a small amount of information data at high frequency, whereby the interference with the second wireless communication system is reduced.

Second Embodiment

Referring to FIGS. 15 to 19, a second embodiment of the invention will be described below. The configuration of the first and second wireless communication systems, the base station apparatus 100, and the mobile stations 201, 202, . . . according to the second embodiment is the same as the configuration of the first and second wireless communication systems, the base station apparatus 100, and the mobile stations 201, 202, . . . as shown in FIGS. 1 to 7, in which the same parts are designated by the same numerals and not described here.

The operation of the base station apparatus 100 according to the second embodiment will be described below using FIGS. 15 to 19. In this embodiment, in a frequency change evaluation process B2 performed by the control part 15 of the base station apparatus 100, the change of the frequency is decided in consideration of the utilization efficiency E of the frequency band FC assigned beforehand to the first wireless communication system, but the other operation of the base station apparatus 100 and the operation of the mobile stations 201, 202, . . . are the same as in the first embodiment, and the explanation thereof is omitted.

Figure 15:
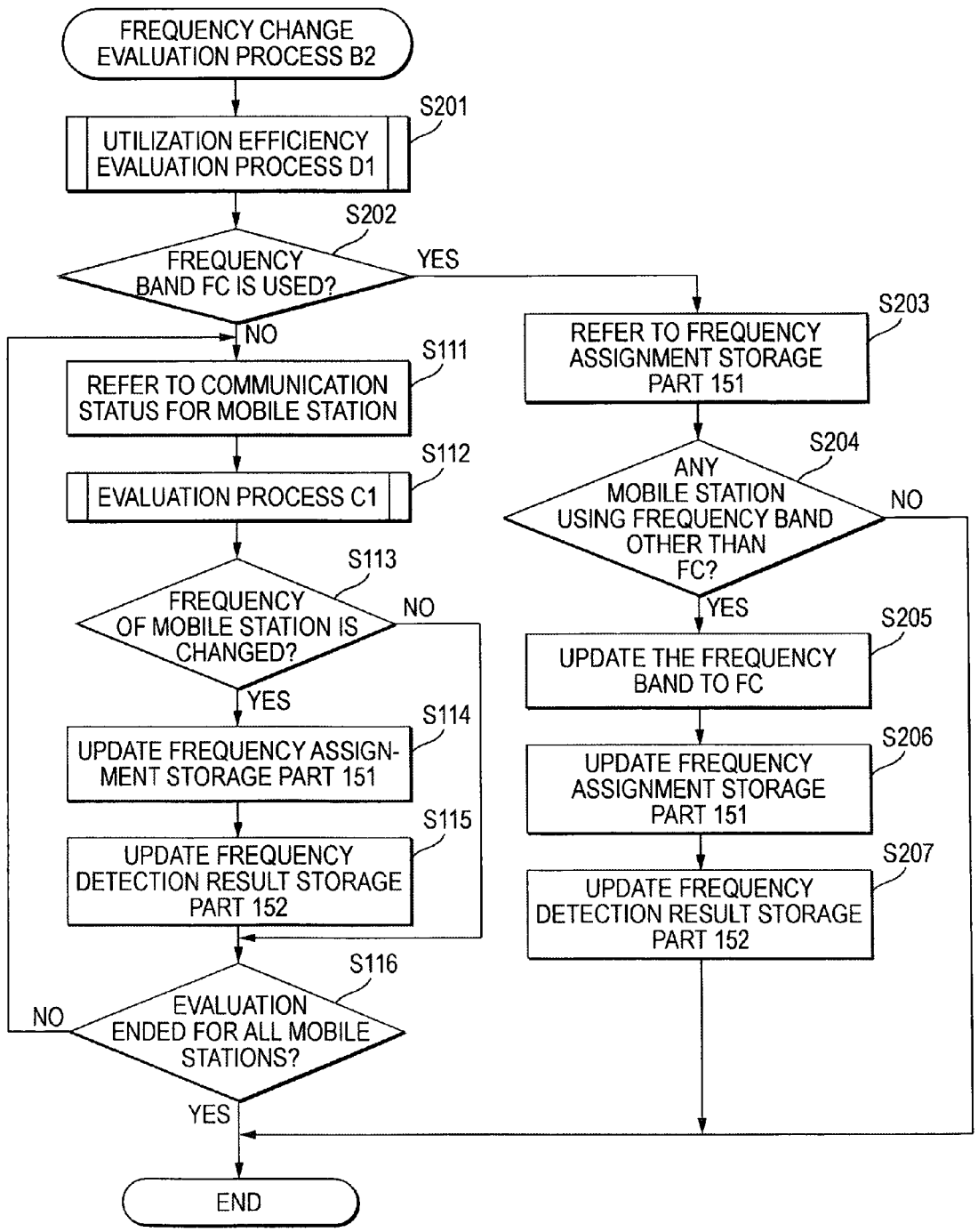
FIG. 15 is a flowchart showing the flow of a frequency change evaluation process B2 according to a second embodiment of the invention.

Referring now to a flowchart of FIG. 15, the frequency change evaluation process B2 according to this embodiment will be described below.

If a certain period passes while the base station apparatus 100 and the mobile stations 201, 202, . . . are communicating, the control part 15 of the base station apparatus 100 starts the frequency change evaluation process B2. First of all, the control part 15 performs a utilization efficiency evaluation process D1 for the frequency band FC by referring to the communication status storage part 153 (step S201). This utilization efficiency evaluation process D1 will be described later.

As a result of this utilization efficiency evaluation process D1, if it is determined that the frequency bands F1, F2, . . . and Fm assigned to the second wireless communication system should be employed (No at step S202), the frequency change evaluation process B2 is the same as the frequency change evaluation process B1 as shown in FIG. 11, in which the same reference signs (steps S111 to S116) are given, and the explanation is omitted.

As a result of the utilization efficiency evaluation process D1, if it is determined that not the frequency bands F1, F2, . . . and Fm but the frequency band FC should be employed (Yes at step S202), the control part 15 refers to the frequency assignment storage part 151 (step S202), and checks whether or not there is any of the mobile stations 201, 202, . . . making the communication employing the frequency bands F1, F2, . . . and Fm (step S203). As a result, if there is no the mobile station 201, 202, . . . making the communication employing the frequency bands F1, F2, . . . and Fm, the frequency change evaluation process B2 is ended.

On the other hand, if there is any of the mobile stations 201, 202, . . . making the communication employing the frequency bands F1, F2, . . . and Fm (Yes at step S204), the frequency band used for the communication for this mobile station 201, 202, . . . is changed to "FC" (step S205). Then, the use frequency 154 of the frequency assignment storage part 151 is updated (step S206), and the frequency usage state flag 157 of the frequency detection result storage part 152 is updated (step S207).

Figure 16:
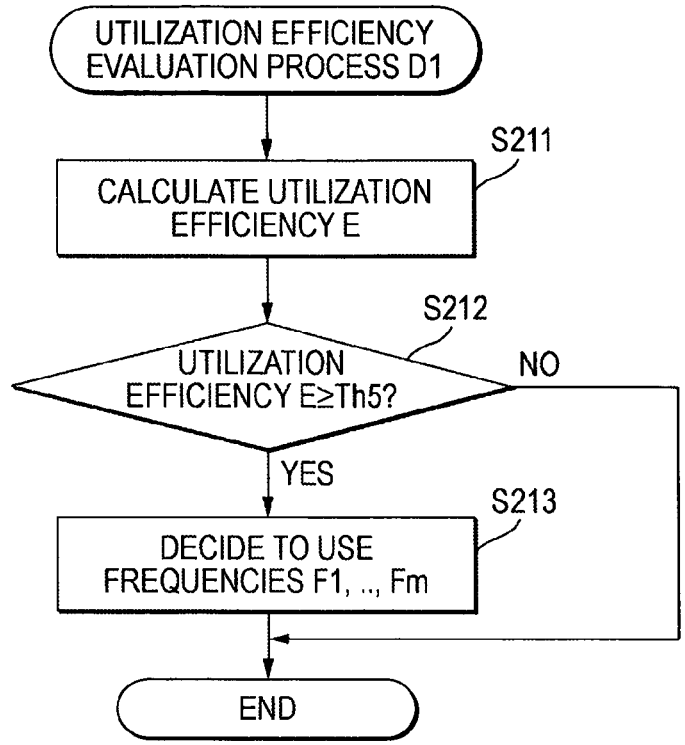
FIG. 16 is a flowchart showing the flow of a utilization efficiency evaluation process D1 according to the second embodiment of the invention.

Referring now to FIGS. 16 to 19, a utilization efficiency evaluation process D1 for the frequency band FC will be described below. FIG. 16 shows a flowchart of the utilization efficiency evaluation process D1 performed by the control part 15.

First of all, the control part 15 refers to the communication status storage part 153, and finds the mobile station that employs the frequency band FC for the communication. Then, the control part 15 calculates the utilization efficiency E of the frequency band FC in the found mobile station (step S211). Herein, the utilization efficiency E is obtained by multiplying the value of the average communication frequency 158 and the value of the average information data length 159 for each mobile station, and totaling the multiplied values for all the found mobile stations. And the control part 15 compares this utilization efficiency E with a preset threshold Th5 (step S212). If the utilization efficiency E is greater than the threshold Th5, it is decided that the frequency bands F1, F2, . . . , Fm are employed (step S213), and the process is ended, or if the utilization efficiency E is smaller than the threshold Th5, it is decided that the frequency bands F1, F2, . . . , Fm are not employed, and the process is ended.

Figure 17:
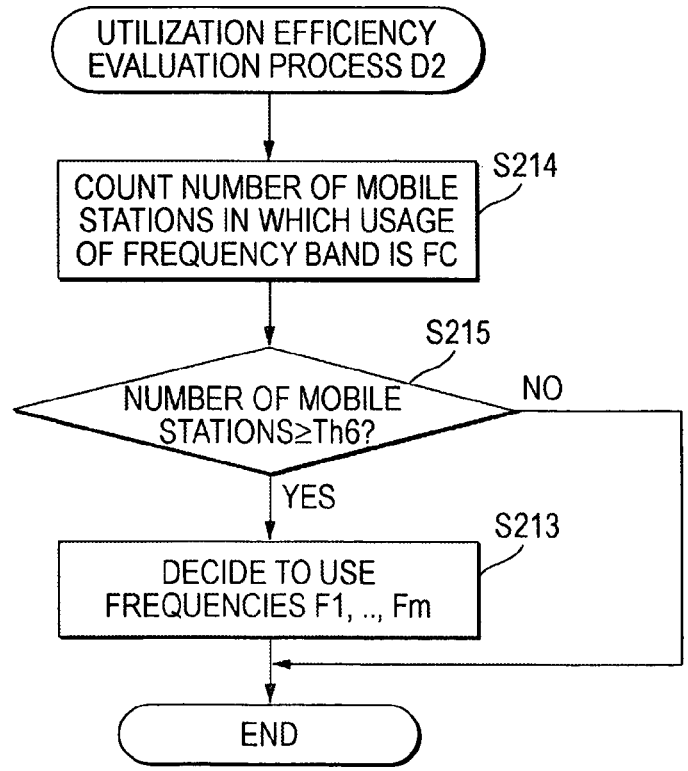
FIG. 17 is a flowchart showing the flow of a utilization efficiency evaluation process D2 according to the second embodiment of the invention.

A utilization efficiency evaluation process D2 that is a variant example of the utilization efficiency evaluation process D1 as shown in FIG. 17 will be described below. This utilization efficiency evaluation process D2 counts the number of mobile stations that employs the frequency band FC for the communication (step S214), instead of calculating the utilization efficiency E, and compares the number of mobile stations with a preset threshold Th6 (step S215), in which points the utilization efficiency evaluation process D2 is different from the utilization efficiency evaluation process D1 as shown in FIG. 16.

Figures 18, 19:
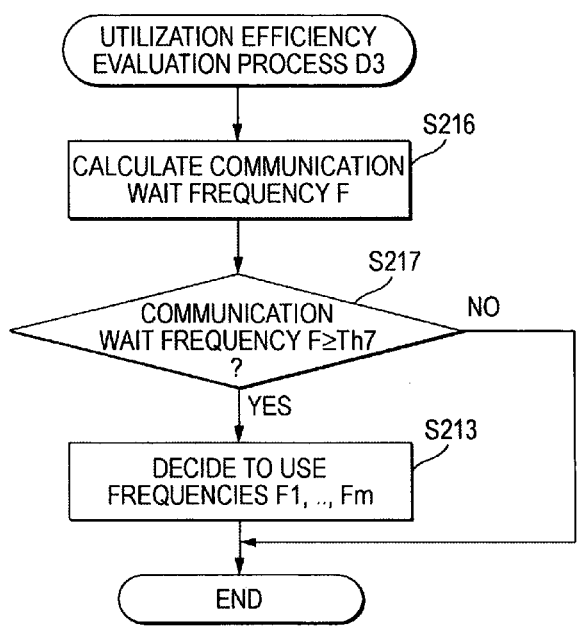
FIG. 18 is a flowchart showing the flow of a utilization efficiency evaluation process D3 according to the second embodiment of the invention.
FIG. 19 is a view showing the configuration of a communication status storage part 153 according to the second embodiment of the invention.

Referring now to FIGS. 18 and 19, another variant example of the utilization efficiency evaluation process D1 will be described below. A utilization efficiency evaluation process D3 calculates a total of communication waiting frequency F for the mobile stations (step S216), instead of calculating the utilization efficiency E, and compares the total of communication waiting frequency F with a preset threshold Th7 (step S217), in which points the utilization efficiency evaluation process D3 is different from the utilization efficiency evaluation process D1 as shown in FIG. 16. Herein, the communication waiting frequency F means the value of counting the fixed periods in the state where the transmission data can not be transmitted because there is any transmission data to the mobile station but the frequency resource is employed by another mobile station. When the control part 15 performs this utilization efficiency evaluation process D3, the communication status storage part 153 newly stores the communication wait frequency F, in addition to the configuration of FIG. 6, as shown in FIG. 19.

With the second embodiment as described above, the same effects are obtained as in the first embodiment. Further, whether or not the frequency band FC should be employed for the communication is decided based on the utilization efficiency evaluation process D1 of the frequency band FC assigned to the first wireless communication system, whereby it is possible to solve the problem that there is an excessive interference with the second wireless communication system if the frequency band assigned to the second wireless communication system is employed more than necessary.

Third Embodiment

Figures 20, 21:
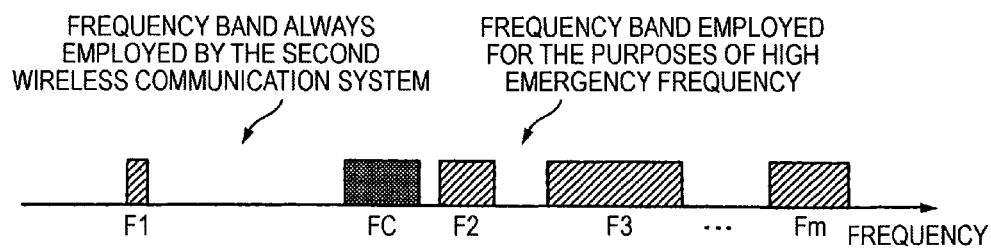
FIG. 20 is a view showing the configuration of frequency bands according to a third embodiment of the invention.
FIG. 21 is a view showing the configuration of a frequency detection storage part 160 according to the third embodiment of the invention.

Referring to FIGS. 20 to 24, a third embodiment will be described below. In the third embodiment as shown in FIG. 20, the bandwidths of the frequency bands F1, F2, . . . and Fm assigned to the second wireless communication system are different. Therefore, a frequency detection result storage part 160 of the base station apparatus 100 stores a frequency bandwidth 161, in addition to the configuration of the frequency detection result storage part 152 as shown in FIG. 5, as shown in FIG. 21. The configuration of the base station apparatus 100 and the mobile stations 201, 202, . . . other than the frequency detection result storage part 160 is the same as the configuration of the first embodiment, in which the same reference numerals are given and the explanation is omitted.

Figure 22:
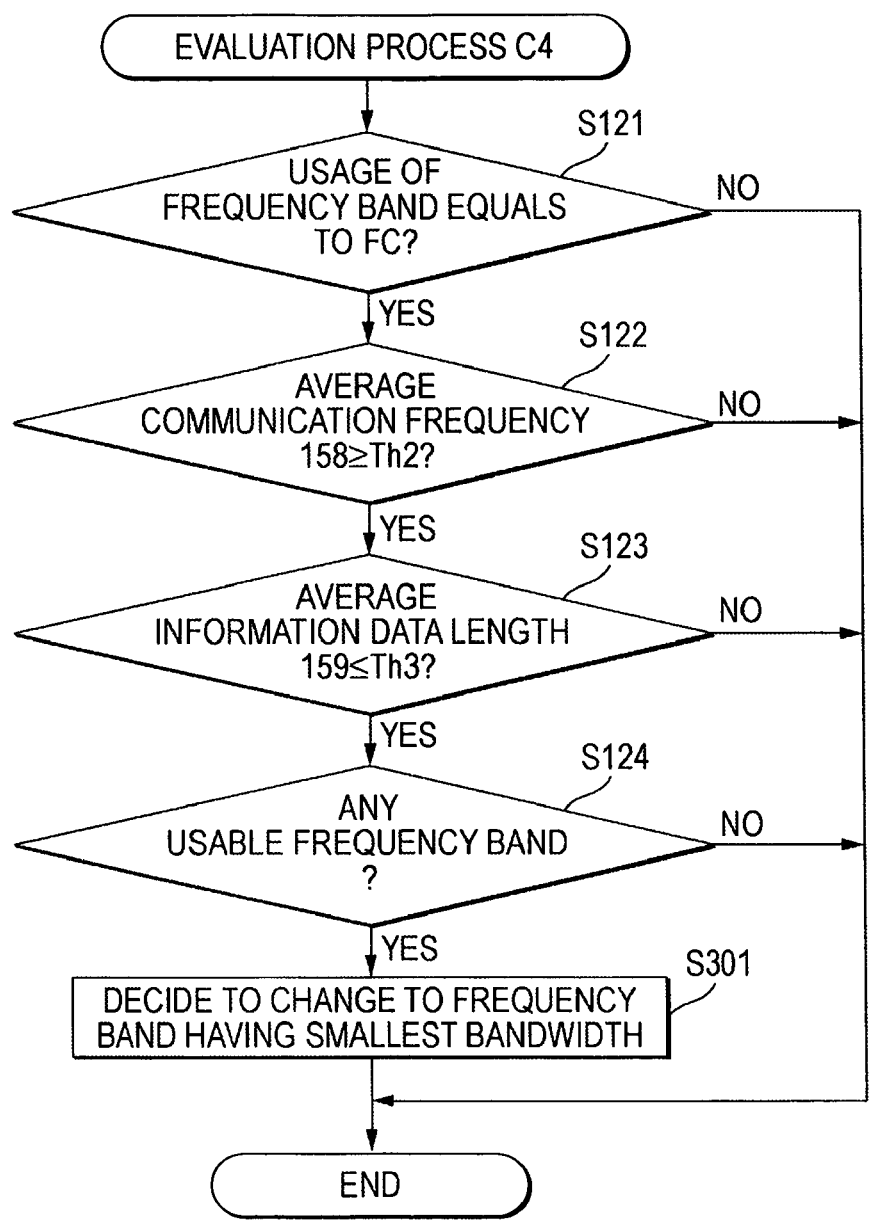
FIG. 22 is a flowchart showing the flow of an evaluation process C4 according to the third embodiment of the invention.
Figure 23:
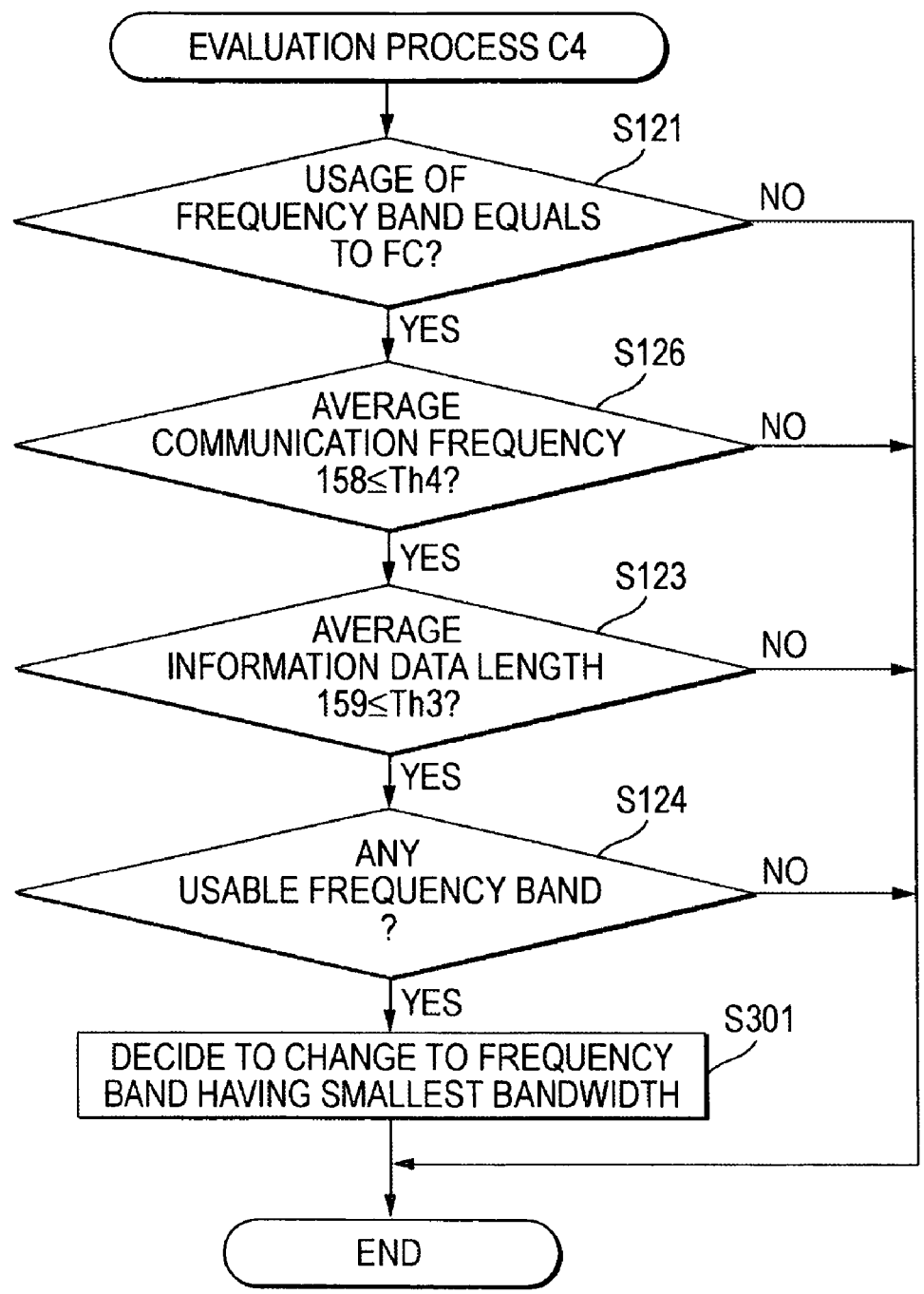
FIG. 23 is a flowchart showing the flow of an evaluation process C5 according to the third embodiment of the invention.
Figure 24:
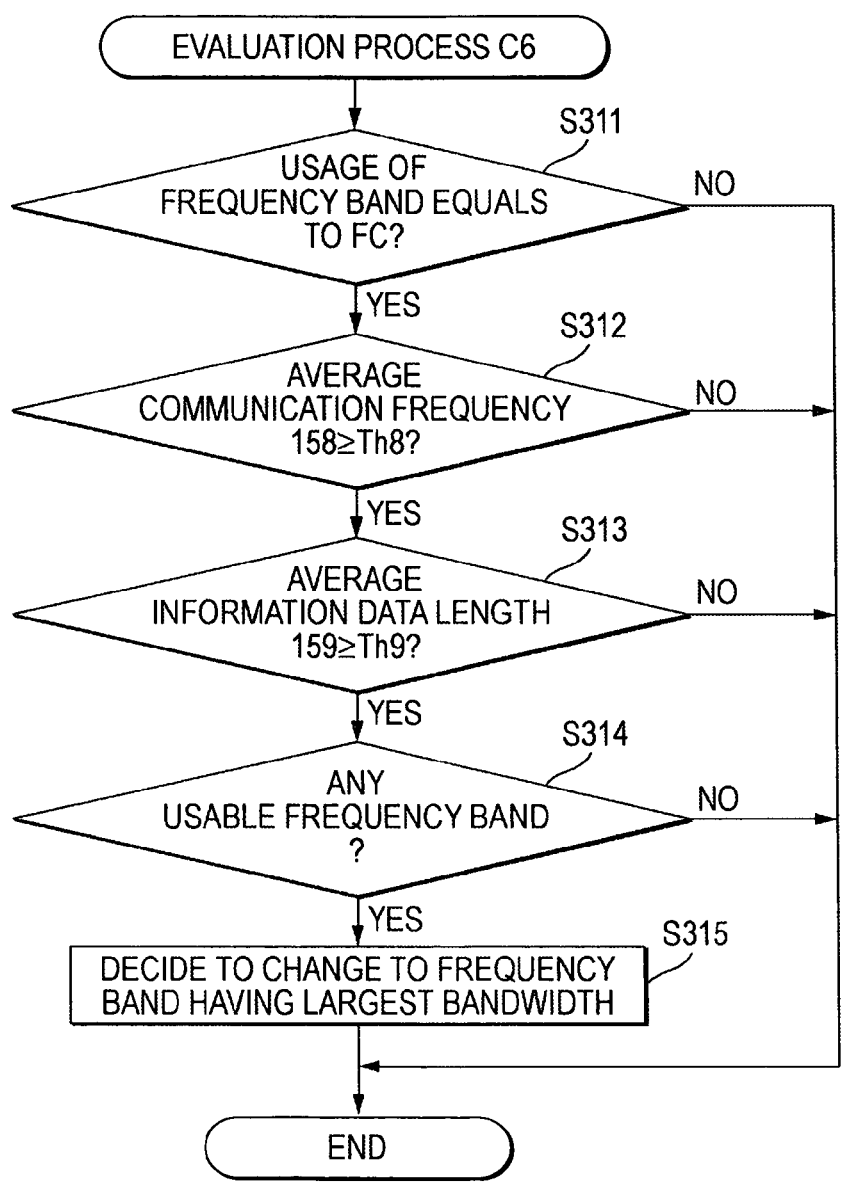
FIG. 24 is a flowchart showing the flow of an evaluation process C6 according to the third embodiment of the invention.

Referring to FIGS. 22 to 24, the operation of the base station apparatus 100 and the mobile stations 201, 202, . . . in this embodiment will be described below. The operation of the base station apparatus 100 and the mobile stations 201, 202, . . . in the third embodiment is the same as in the first embodiment, except that the contents that the control part 15 of the base station apparatus 100 and the control part 25 of the mobile stations 201, 202, . . . notify to the second wireless communication circuit 12-1, . . . , 12-N, 22 in making the communication employing the frequency bands F1, F2, . . . and Fm assigned to the second wireless communication system, and the evaluation process C4 in the frequency change evaluation process B1 performed by the control part 15 of the base station apparatus 100. Therefore, the explanation thereof is omitted.

First of all, the operation of the control parts 15 and 25 will be described below using to FIGS. 3 and 7.

The control part 15 of the base station apparatus 100 as shown in FIG. 3 notifies the frequency bands F1, . . . , Fm used for communication to the radio processing circuits 123-1, 124-1, . . . , 123-N, 124-N for the second wireless communication circuits 12-1, . . . , 12-N used for transmission and reception in making the communication employing the frequency bands F1, F2, . . . and Fm, and also notifies the bandwidths of the frequency bands F1, . . . , Fm.

Similarly, the control part 25 of the mobile stations 201, 202, . . . as shown in FIG. 7 notifies the frequency bands F1, . . . , Fm used for communication to the radio processing circuits 223, 224 for the second wireless communication circuit 22 used for transmission and reception, and also notifies the bandwidths of the frequency bands.

Referring now to FIGS. 22 to 24, an evaluation process C4 in the frequency change evaluation process B1 performed by the control part 15 of the base station apparatus 100 will be described below. The evaluation process C4 as shown in FIG. 22 is the same as the evaluation process C1 as shown in FIG. 12 in the point that the change of the frequency band is decided if there is any mobile station communicating a small amount of information data at high frequency in deciding to change the frequency band, in which the same reference signs (steps S121 to S124) are given and the explanation is omitted. In this evaluation process C4, when the change of the frequency band is decided, the frequency band having the narrowest bandwidth is selected if there are a plurality of changeable frequency bands (step S301).

An evaluation process C5 as shown in FIG. 23 will be described below. The evaluation process C5 is the same as the evaluation process C2 as shown in FIG. 13 in the point that the change of the frequency band is decided if there is any mobile station communicating a small amount of information data at low frequency in deciding to change the frequency band by evaluating the communication status of the mobile station, in which the same reference signs (steps S121, S126, S123, S124) are given and the explanation is omitted. In this evaluation process C5, when the change of the frequency band is decided, the frequency band having the narrowest bandwidth is selected if there is a plurality of changeable frequency bands (step S302).

An evaluation process C6 as shown in FIG. 24 will be described below. Herein, the evaluation process C6 for the mobile station 201 is performed. In the evaluation process C6 as shown in FIG. 24, first of all, the control part 15 determines whether or not the frequency band used for the mobile station 201 is the frequency band FC assigned to the first wireless communication system by referring to the frequency assignment storage part 151 (step S311). If the used frequency band 154 is not "FC", the control part 15 decides that the change of the frequency band is not performed and the process C6 is ended.

On the other hand, if the used frequency band 154 is "FC", the control part 15 determines whether or not the value of the average communication frequency 158 (see FIG. 6) stored with the ID of the mobile station 201 is greater than or equal to a preset threshold Th7 by referring to the communication status storage part 153 (step S312). Also, if the value of the average communication frequency 158 is smaller than the threshold Th7, it is decided that the change of the frequency band is not performed and the process C6 is ended.

On the other hand, if the value of the average communication frequency 158 is greater than or equal to the threshold Th7, the control part 15 determines whether or not the value of the average information data length 159 (see FIG. 6) stored with the ID of the mobile station 201 is greater than or equal to a preset threshold Th8 by referring to the communication status storage part 153 again (step S313). As a result of determination, if the value of the average information data length 159 is smaller than the threshold Th8, it is decided that the change of the frequency band is not performed and the process C6 is ended.

On the other hand, if the value of the average information data length 159 is greater than or equal to the threshold Th8, the control part 15 determines whether or not there is any changeable frequency band by referring to the frequency usable flag 156 of the frequency detection result storage part 152. That is, it is determined that if all the frequency usable flags 156 are "0" by referring to the frequency usable flags 156 of all the frequency bands F1, . . . , Fm, there is no changeable frequency band, or if there is any frequency band with the frequency usable flag 156 of "1", there is any changeable frequency band (step S314). As a result of determination, if there is no changeable frequency band, it is decided that the change of the frequency band is not performed and the process C6 is ended.

On the other hand, if it is determined that there is any changeable frequency bands, the control part 15 decides the change of the frequency band (step S315). At this time, if the frequency band Fi with the frequency usable flag 156 of "1," is "F3" alone, as shown in FIG. 6, the control part 15 decides that the frequency band F3 is employed after change. Also, if a plurality of frequency usable flags 156 are "1", the control part 15 decides that the frequency band Fi having the largest bandwidth is employed for the communication with the mobile station 201 by referring to the frequency detection result storage part 152.

That is, in the evaluation process C6, the communication status of the mobile stations 201, 202, . . . are evaluated. If there is any mobile station communicating a large amount of information data at high frequency, the frequency band is changed to make the communication employing the frequency band Fi having the largest bandwidth among the usable frequency bands.

With the third embodiment as described above, the same effects are obtained as in the first embodiment. When there is any mobile station making the communication employing the frequency band FC, and the control part 15 of the base station apparatus 100 decides that the frequency band used for the communication with the mobile station is changed by selecting one of the plurality of frequency bands, the frequency band having the smallest bandwidth is selected for the communication with the mobile station communicating a small amount of information data, and the frequency band having the largest bandwidth is selected for the communication with the mobile station communicating a large amount of information data at high frequency, whereby the frequency bands F1, F2, . . . and Fm assigned to the second wireless communication system are prevented from being employed over a wide bandwidth for a long time, and the interference with the second wireless communication system is reduced.

As described above with reference to the embodiments, there are provided, a base station apparatus, a wireless communication system and a frequency assignment method in which the frequency resources can be used efficiently without causing the lower throughput or the refusal of communication request even if the communication traffic volume increases due to the increasing number of users.

The foregoing description of the embodiments has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A base station apparatus that communicates with a plurality of mobile stations belonging to a first wireless communication system, the base station apparatus comprising:
    a first wireless communication circuit that communicates with a first mobile station employing a first frequency band that is preferentially assigned to the first wireless communication system;
    a plurality of second wireless communication circuits that communicates with a second mobile station employing at least one of a plurality of second frequency bands that are preferentially assigned to other wireless communication systems;
    a frequency detection unit that detects a usage of the second frequency bands by periodically detecting an electrical power of the second frequency bands in the second wireless communication circuits;
    a detection result storage unit that stores a history of the usage of the second frequency bands detected by the frequency detection unit;
    a communication status storage unit that stores a communication status including an average communication frequency of information data per unit time during the communication with the first mobile station using the first frequency band; and
    a frequency change control unit that determines if there is any unused second frequency band that is not used by the other wireless communication systems, based on the history of the usage of the second frequency bands stored in the detection result storage unit, and that changes the frequency for the communication with the first mobile station using the first frequency band from the first frequency band to the unused second frequency band, based on the determination result of the unused second frequency band and the communication status for the first mobile station using the first frequency band stored in the communication status storage unit.

2. The base station apparatus according to claim 1, wherein the frequency change control unit changes the frequency for the communication with the first-mobile station from the first frequency band to the unused second frequency band, when determined that the second frequency band exists and the average communication frequency of the first mobile station during the communication using the first frequency band is less than or equal to a predetermined value.

3. The base station apparatus according to claim 2, wherein, when a plurality of the unused second frequency bands exist, the frequency change control unit changes the frequency for the communication with the first mobile station from the first frequency band to one of the unused second frequency bands that is closer to the first frequency band.

4. The base station apparatus according to claim 2, wherein, when a plurality of the unused second frequency bands exist, the frequency change control unit changes the frequency for the communication with the first mobile station from the first frequency band to one of the unused second frequency bands that has the narrowest bandwidth among the unused second frequency bands.

5. The base station apparatus-according to claim 2, further comprising a frequency utilization efficiency evaluation unit that calculates a utilization efficiency of the first frequency band based on the communication status stored in the communication status storage unit,
    wherein the frequency change control unit changes the frequency for the communication with the first mobile station from the first frequency band to the unused second frequency band when the utilization efficiency calculated by the frequency utilization efficiency evaluation unit is greater than a predetermined value.

6. The base station apparatus according to claim 5, wherein the frequency change control unit changes the frequency for the communication with the second mobile station from the unused second frequency band to the first frequency band when the utilization efficiency calculated by the frequency utilization efficiency evaluation unit is less than or equal to the predetermined value.

7. The base station apparatus according to claim 2, further comprising a frequency utilization efficiency evaluation unit that counts a number of the mobile stations during the communication employing the first frequency band,
    wherein the frequency change control unit changes the frequency for the communication with the first mobile station from the first frequency band to the unused second frequency band when the number of the first mobile stations counted by the frequency utilization efficiency evaluation unit is greater than a predetermined value.

8. The base station apparatus according to claim 7, wherein the frequency change control unit changes the frequency for the communication with the second mobile station from the unused second frequency band to the first frequency band when the number of the first mobile stations counted by the frequency utilization efficiency evaluation unit is less than or equal to the predetermined value.

9. The base station apparatus according to claim 2, wherein the communication status storage unit stores the communication status further including a communication waiting frequency of the first mobile station and the second mobile station,
   wherein the base station apparatus further comprises a frequency utilization efficiency evaluation unit that calculates a total of the communication waiting frequencies stored in the communication status storage unit, and
   wherein the frequency change control unit changes the frequency for the communication with the first mobile station from the first frequency band to the unused second frequency band when the total of the communication waiting frequencies calculated by the frequency utilization efficiency evaluation unit is greater than a predetermined value.

10. The base station apparatus according to claim 9, wherein the frequency change control unit changes the frequency for the communication with the second mobile station from the unused second frequency band to the first frequency band when the total of the communication wait frequencies calculated by the frequency utilization efficiency evaluation unit is less than or equal to the predetermined value.

11. The base station apparatus according to claim 1, wherein the communication status storage unit stores the communication status further including an average data length of the information data with the first and second mobile stations, and
   wherein the frequency change control unit changes the frequency for the communication with the first mobile station from the first frequency band to the unused second frequency band, when determined that the second frequency band exists, while the average communication frequency of the first mobile station during the communication using the first frequency band is greater than or equal to a first predetermined value, and while the average data length is less than or equal to a second predetermined value.

12. The base station apparatus according to claim 11, wherein, when a plurality of the unused second frequency bands exist, the frequency change control unit changes the frequency for the communication with the first mobile station from the first frequency band to one of the unused second frequency bands that is closer to the first frequency band.

13. The base station apparatus according to claim 11, wherein, when a plurality of the unused second frequency bands exist, the frequency change control unit changes the frequency for the communication with the first mobile station from the first frequency band to one of the unused second frequency bands that has the narrowest bandwidth among the unused second frequency bands.

14. The base station apparatus according to claim 11, further comprising a frequency utilization efficiency evaluation unit that calculates a utilization efficiency of the first frequency band based on the communication status stored in the communication status storage unit,
   wherein the frequency change control unit changes the frequency for the communication with the first mobile station from the first frequency band to the unused second frequency band when the utilization efficiency calculated by the frequency utilization efficiency evaluation unit is greater than a predetermined value.

15. The base station apparatus according to claim 14, wherein the frequency change control unit changes the frequency for the communication with the second mobile station from the unused second frequency band to the first frequency band when the utilization efficiency calculated by the frequency utilization efficiency evaluation unit is less than or equal to the predetermined value.

16. The base station apparatus according to claim 11, further comprising a frequency utilization efficiency evaluation unit that counts a number of the first mobile stations during the communication employing the first frequency band,
   wherein the frequency change control unit changes the frequency for the communication with the first mobile station from the first frequency band to the unused second frequency band when the number of the first mobile stations counted by the frequency utilization efficiency evaluation unit is greater than a predetermined value.

17. The base station apparatus according to claim 16, wherein the frequency change control unit changes the frequency for the communication with the second mobile station from the unused second frequency band to the first frequency band when the number of the first mobile stations counted by the frequency utilization efficiency evaluation unit is less than or equal to the predetermined value.

18. The base station apparatus according to claim 11, wherein the communication status storage unit stores the communication status further including a communication waiting frequency of the first mobile station and the second mobile station,
   wherein the base station apparatus further comprises a frequency utilization efficiency evaluation unit that calculates a total of the communication waiting frequencies stored in the communication status storage unit, and
   wherein the frequency change control unit changes the frequency for the communication with the first mobile station from the first frequency band to the unused second frequency band when the total of the communication wait frequencies calculated by the frequency utilization efficiency evaluation unit is greater than a predetermined value.

19. The base station apparatus according to claim 18, wherein the frequency change control unit changes the frequency for the communication with the second mobile station from the unused second frequency band to the first frequency band when the total of the communication wait frequencies calculated by the frequency utilization efficiency evaluation unit is less than or equal to the predetermined value.

20. The base station apparatus according to claim 1, wherein the communication status storage unit stores the communication status further including an average data length of the information data with the first and second mobile stations, and
   wherein, when determined that a plurality of the second frequency bands exist, while the average communication frequency of the first mobile station during the communication using the first frequency band is greater than or equal to a first predetermined value, and while the average data length is greater than or equal to a second predetermined value, the frequency change control unit changes the frequency for the communication with the first mobile station from the first frequency band to one of the unused second frequency bands that has widest bandwidth among the unused second frequency bands.

21. The base station apparatus according to claim 20, further comprising a frequency utilization efficiency evaluation unit that calculates a utilization efficiency of the first frequency band based on the communication status stored in the communication status storage unit,
    wherein the frequency change control unit changes the frequency for the communication with the first mobile station from the first frequency band to the unused second frequency band when the utilization efficiency calculated by the frequency utilization efficiency evaluation unit is greater than a predetermined value.

22. The base station apparatus according to claim 21, wherein the frequency change control unit changes the frequency for the communication with the second mobile station from the unused second frequency band to the first frequency band when the utilization efficiency calculated by the frequency utilization efficiency evaluation unit is less than or equal to the predetermined value.

23. The base station apparatus according to claim 20, further comprising a frequency utilization efficiency evaluation unit that counts a number of the first mobile stations during the communication employing the first frequency band,
    wherein the frequency change control unit changes the frequency for the communication with the first mobile station from the first frequency band to the unused second frequency band when the number of the first mobile stations counted by the frequency utilization efficiency evaluation unit is greater than a predetermined value.

24. The base station apparatus according to claim 23, wherein the frequency change control unit changes the frequency for the communication with the second mobile station from the unused second frequency band to the first frequency band when the number of the first mobile stations counted by the frequency utilization efficiency evaluation unit is less than or equal to the predetermined value.

25. The base station apparatus according to claim 20, wherein the communication status storage unit stores the frequency for the communication status further including a communication waiting frequency of the first mobile station and the second mobile station,
    wherein the base station apparatus further comprises a frequency utilization efficiency evaluation unit that calculates a total of the communication waiting frequencies stored in the communication status storage unit, and
    wherein the frequency change control unit changes the frequency for the communication with the first mobile station from the first frequency band to the unused second frequency band when the total of the communication waiting frequencies calculated by the frequency utilization efficiency evaluation unit is greater than a predetermined value.

26. The base station apparatus according to claim 25, wherein the frequency change control unit changes the frequency for the communication with the second mobile station from the unused second frequency band to the first frequency band when the total of the communication waiting frequencies calculated by the frequency utilization efficiency evaluation unit is less than or equal to the predetermined value.

27. A wireless communication system comprising:
a first mobile station;
a plurality of second mobile stations; and
a base station apparatus that communicates with the first and second mobile stations belonging to the wireless communication system,
wherein the base station apparatus comprises:
a first wireless communication circuit that communicates with the first mobile station employing a first frequency band that is preferentially assigned to the wireless communication system;
a plurality of second wireless communication circuits that communicates with the second mobile stations employing at least one of a plurality of second frequency bands that are preferentially assigned to other wireless communication systems;
a frequency detection unit that detects a usage of the second frequency bands by periodically detecting an electrical power of the second frequency bands in the second wireless communication circuits;
a detection result storage unit that stores a history of the usage of the second frequency bands detected by the frequency detection unit;
a communication status storage unit that stores a communication status including an average communication frequency of information data per unit time during the communication with the first mobile station using the first frequency band; and
a frequency change control unit that determines if there is any unused second frequency band that is not used by the other wireless communication systems, based on the history of the usage of the second frequency bands stored in the detection result storage unit, and that changes the frequency for the communication with the first mobile station using the first frequency band from the first frequency band to the unused second frequency band, based on the determination result of the unused second frequency band and the communication status for the first mobile station using the first frequency band stored in the communication status storage unit, and
wherein each of the first and second mobile stations comprises:
a third wireless communication circuit that communicates with the base station apparatus employing the first frequency band; and
a fourth wireless communication circuit that communicates with the base station apparatus employing at least one of the plurality of second frequency bands.

28. The wireless communication system according to claim 27, wherein the frequency change control unit changes the frequency for the communication with the first mobile station from the first frequency band to the unused second frequency band, when determined that the second frequency band exists and the average communication frequency of the first mobile station during the communication using the first frequency band is less than or equal to a predetermined value.

29. The wireless communication system according to claim 27, wherein the communication status storage unit stores the communication status further including an average data length of the information data with the first and second mobile stations, and
    wherein the frequency change control unit changes the frequency for the communication with the first mobile station from the first frequency band to the unused second frequency band, when determined that the second frequency band exists, while the average communication frequency of the first mobile station during the communication using the first frequency band is greater than or equal to a first predetermined value, and while the average data length is less than or equal to a second predetermined value.

30. A method for assigning a frequency to be used for a wireless communication between a base station and a first mobile station,
    wherein the base station is configured to communicate with the first base station employing a first frequency band that is preferentially assigned to a first wireless communication system, and to communicate with a second mobile station employing at least one of a plurality of second frequency bands that are preferentially assigned to other wireless communication systems, and wherein the method comprising:
detecting a usage of the second frequency bands by periodically detecting an electrical power of the second frequency bands;
storing a history of the detected usage of the second frequency bands;
calculating a communication status including an average communication frequency of information data per unit time during the communication with the first mobile station using the first frequency band;
determining if there is any unused second frequency band that is not used by the other wireless communication systems based on the stored history of the usage of the second frequency bands; and
assigning the frequency for the communication with the first mobile station from the first frequency band to the unused second frequency band, based on the determination result of the unused second frequency band and the calculated communication status.

31. The method according to claim 30, wherein the communication with the first mobile station is changed from the first frequency band to the unused second frequency band, when determined that the second frequency band exists and the average communication frequency of the first mobile station during the communication using the first frequency band is less than or equal to a predetermined value.

32. The method according to claim 30, wherein the communication status further including an average data length of the information data with the first and second mobile stations, and
wherein the communication with the first mobile station is changed from the first frequency band to the unused second frequency band, when determined that the second frequency band exists, while the average communication frequency of the first mobile station during the communication using the first frequency band is greater than or equal to a first predetermined value, and while the average data length is less than or equal to a second predetermined value.

* * * * *